(12) United States Patent
Wakazono

(10) Patent No.: US 9,374,519 B2
(45) Date of Patent: Jun. 21, 2016

(54) IMAGE PROCESSING APPARATUS, IMAGE PROCESSING METHOD, AND PROGRAM

(71) Applicant: SONY CORPORATION, Tokyo (JP)

(72) Inventor: Masafumi Wakazono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/447,034

(22) Filed: Jul. 30, 2014

(65) Prior Publication Data

US 2015/0042866 A1 Feb. 12, 2015

(30) Foreign Application Priority Data

Aug. 8, 2013 (JP) ................. 2013-165001

(51) Int. Cl.
*H04N 5/232* (2006.01)
*H04N 5/235* (2006.01)
*H04N 5/243* (2006.01)

(52) U.S. Cl.
CPC ......... *H04N 5/23212* (2013.01); *H04N 5/2353* (2013.01); *H04N 5/23229* (2013.01); *H04N 5/23293* (2013.01); *H04N 5/243* (2013.01)

(58) Field of Classification Search
CPC .......... H04N 5/23212; H04N 5/23293; H04N 5/23229; H04N 5/2353

USPC .......................................................... 348/346
See application file for complete search history.

(56) References Cited

U.S. PATENT DOCUMENTS

| | | | | |
|---|---|---|---|---|
| 2006/0033831 A1* | 2/2006 | Ejima | ................ | H04N 5/23216 348/333.01 |
| 2009/0231454 A1* | 9/2009 | Miura | ................ | H04N 5/23212 348/220.1 |
| 2009/0303375 A1* | 12/2009 | Ohyama | ............ | H04N 5/23219 348/333.12 |
| 2011/0273610 A1* | 11/2011 | Tay | .................... | H04N 5/23212 348/345 |

FOREIGN PATENT DOCUMENTS

| | | |
|---|---|---|
| JP | 2003-046844 A | 2/2003 |
| JP | 3530907 B2 | 3/2004 |
| JP | 2010-114556 A | 5/2010 |

* cited by examiner

*Primary Examiner* — Gevell Selby
(74) *Attorney, Agent, or Firm* — Chip Law Group

(57) ABSTRACT

An image processing apparatus includes: an evaluation value generation unit configured to generate a focus evaluation value indicating a degree of focus of image data which is a target; an evaluation value stabilization unit configured to perform a stabilization process on the focus evaluation value generated by the evaluation value generation unit; and a display data generation unit configured to generate display data, in which focus information is added to the image data, using the focus evaluation value subjected to the stabilization process by the evaluation value stabilization unit.

17 Claims, 14 Drawing Sheets

CAPTURED IMAGE

IMAGE IN WHICH EDGE IN FOCUS IS
ENHANCED AND DISPLAYED

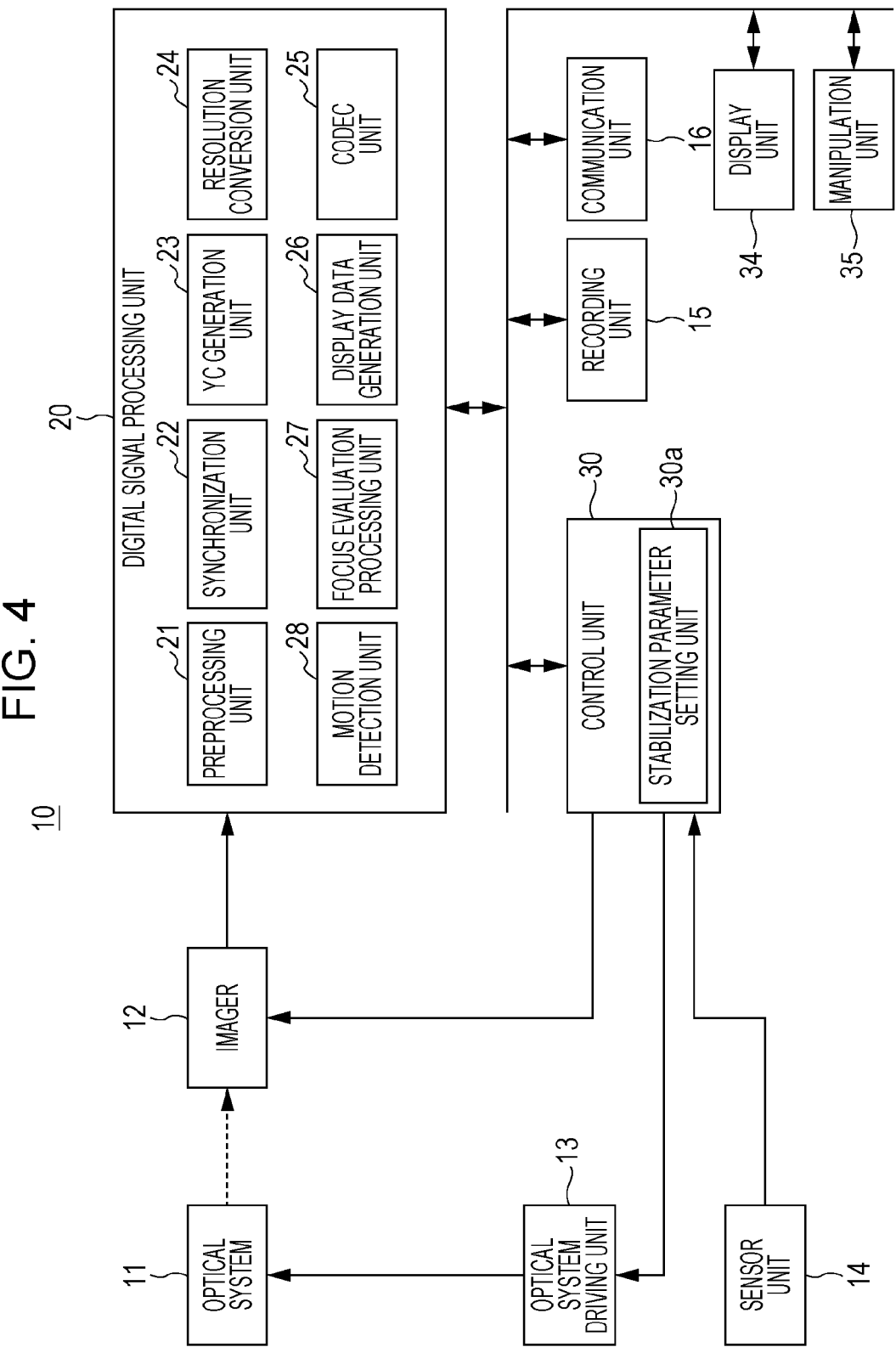

FIG. 6A

| BK | BK | BK | BK | | BK |
|----|----|----|----|----|----|
| BK | BK | BK | BK | | BK |
| BK | BK | BK | BK | | BK |
| BK | BK | BK | BK | | BK |
| | | | | | |
| BK | BK | BK | BK | | BK |

FIG. 6B

SPACE FILTER COEFFICIENT a

| 1/25 | 1/25 | 1/25 | 1/25 | 1/25 |
|------|------|------|------|------|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

INPUT IMAGE

RAW FOCUS EVALUATION VALUE

STABILIZED FOCUS EVALUATION VALUE

PEAKING DISPLAY EXAMPLE

PEAKING DISPLAY EXAMPLE

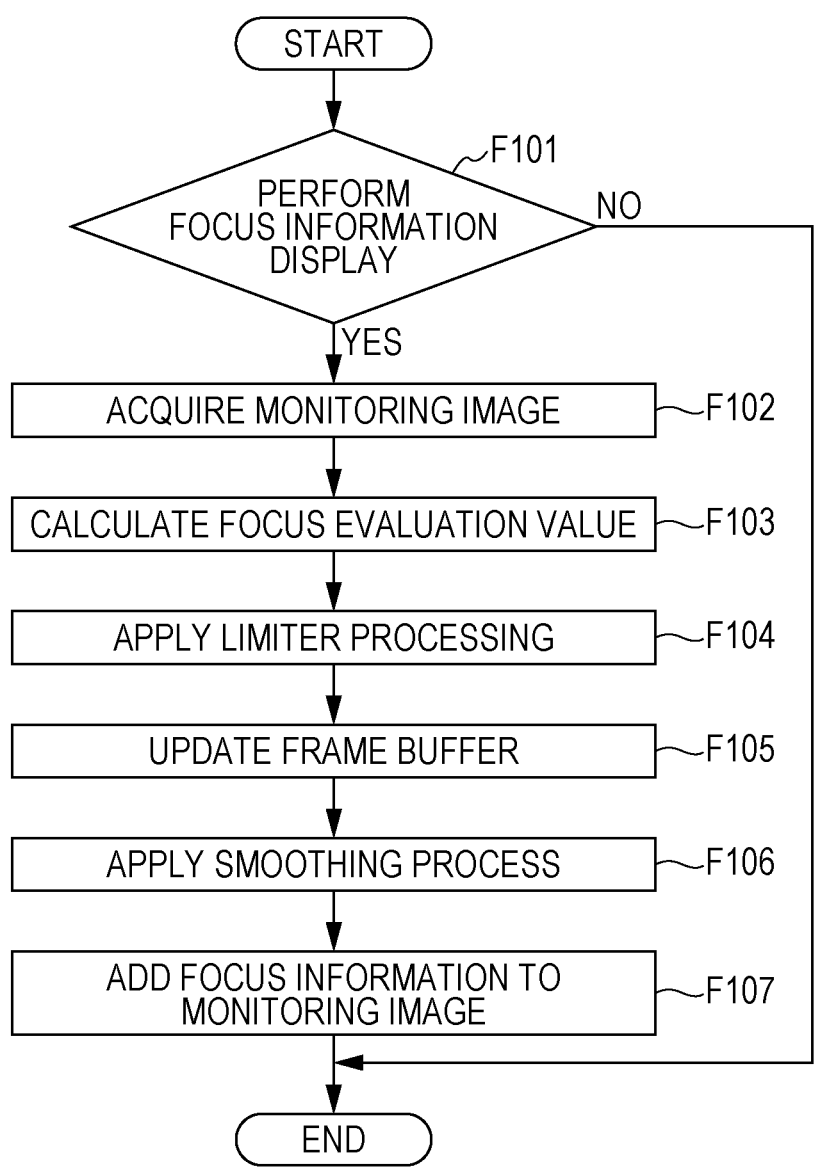

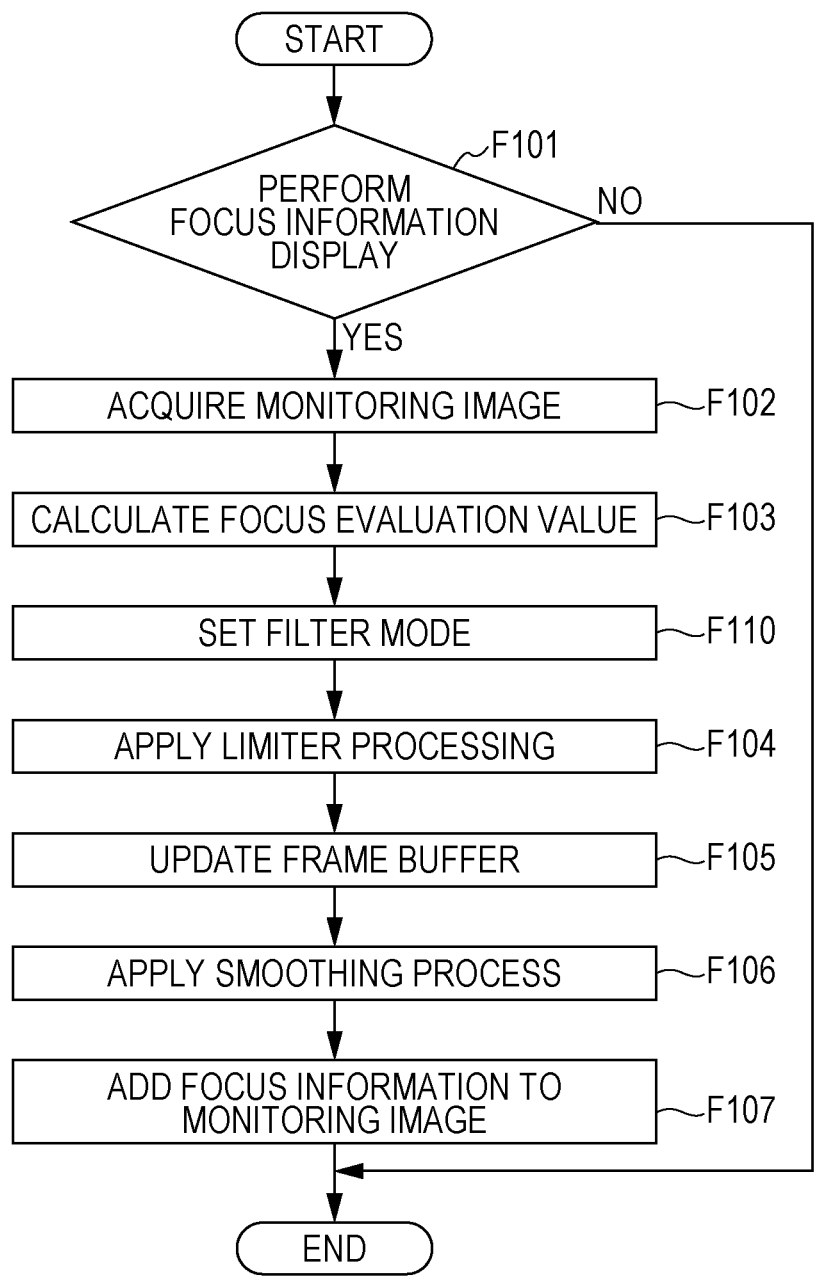

IMAGE PROCESSING APPARATUS, IMAGE PROCESSING METHOD, AND PROGRAM

CROSS REFERENCE TO RELATED REPLICATIONS

This application claims the benefit of Japanese Priority Patent Application JP 2013-165001 filed Aug. 8, 2013, the entire contents of which are incorporated herein by reference.

BACKGROUND

The present technology relates to an image processing apparatus, an image processing method, and a program enhancing and displaying a focused portion on an image.

In imaging apparatuses such as digital still cameras and digital video cameras, there are functions of enhancing and displaying focused areas on captured monitoring images (through image) and presenting focused areas on the captured image to users for the purpose of focusing or focus confirmation.

Japanese Patent No. 3530907 discloses a method of facilitating awareness of out of focus by performing an image-quality deterioration process, such as a shading process or luminance modulation, on a region out of focus.

Japanese Unexamined Patent Application Publication No. 2010-114556 discloses a technology for enhancing and displaying the contour (edge portion) of a subject as so-called peaking.

Japanese Unexamined Patent Application Publication No. 2003-46844 discloses a technology for detecting whether each region of an image is in focus or out of focus, and enhancing and displaying the edge of the region in focus to easily distinguish a portion in focus.

In functions of Japanese Patent No. 3530907, Japanese Unexamined Patent Application Publication No. 2010-114556, and Japanese Unexamined Patent Application Publication No. 2003-46844, image data of a portion for which evaluation is desired is analyzed, a focus evaluation value is calculated, and focus information display such as peaking, shading, and edge enhancement is controlled according to the focus evaluation value.

SUMMARY

When a focus evaluation value is calculated, noise may be contained in input image data, and thus a large error may be contained in the evaluation value in some cases. This is because image differential processing used to calculate the evaluation value has a property of reducing an S/N ratio. As differential processing, second-order differential (Laplasian filter) or first-order differential (Sobel filter) is properly used.

When focus information is displayed on a monitoring screen using the focus evaluation value in which an error is contained, a marker line may seem to shake or be interrupted or irregularly blink, or a fine marker line may occur in an out of focus portion in the case of peaking.

In the case of the method disclosed in Japanese Patent No. 3530907, an application method for the shading process or the luminance modulation may be irregularly changed for each frame, and thus it may be difficult to confirm a focus state.

It is desirable to provide a technology for suppressing disturbance of an evaluation value due to image noise by stabilizing a focus evaluation value and enabling stable focus information display.

According to an embodiment of the present technology, there is provided an image processing apparatus including: an evaluation value generation unit configured to generate a focus evaluation value indicating a degree of focus of image data which is a target; an evaluation value stabilization unit configured to perform a stabilization process on the focus evaluation value generated by the evaluation value generation unit; and a display data generation unit configured to generate display data, in which focus information is added to the image data, using the focus evaluation value subjected to the stabilization process by the evaluation value stabilization unit.

That is, for example, the stabilization process such as the limiter processing or the smoothing process is performed without directly using the focus evaluation value. The focus information display is performed using the stabilized focus evaluation value.

The image processing apparatus according to the embodiment of the present technology may further include a stabilization parameter setting unit configured to variably set a processing parameter of the stabilization process performed by the evaluation value stabilization unit.

In the stabilization process, the proper degree of stabilization, or a circumstance such as a case in which the stabilization has to be performed or a case in which the stabilization may not be performed is assumed in some cases. Accordingly, the uniform stabilization process is not typically performed, but the stabilization process is bypassed according to a circumstance or the degree of stabilization is increased or decreased.

In the image processing apparatus according to the embodiment of the present technology, the evaluation value generation unit may generate the focus evaluation value for each of a plurality of blocks divided as regions from the image data of one frame which is a target.

That is, it is possible to obtain the focus evaluation value for each region (block) of the image data of one frame, perform the stabilization process on the focus evaluation value, and then display the focus information for each block.

In the image processing apparatus according to the embodiment of the present technology, the evaluation value stabilization unit may perform limiter processing as the stabilization process such that a difference between the focus evaluation value of the image data of one frame which is a target and the focus evaluation value of the image data of a previous frame is within a predetermined value.

Through the limiter processing, the focus evaluation value is configured not to be quickly varied due to the influence of noise or the like.

In the image processing apparatus according to the embodiment of the present technology, the evaluation value generation unit may generate the focus evaluation value for each of a plurality of blocks divided as regions from the image data of one frame which is a target. The evaluation value stabilization unit may perform limiter processing as the stabilization process such that a difference between the focus evaluation value of each block and the focus evaluation value of the corresponding block of the image data of a previous frame is within a predetermined value.

Through the limiter processing for each block, the focus evaluation value of each block is configured not to be quickly varied due to the influence of noise or the like.

In the image processing apparatus according to the embodiment of the present technology, the evaluation value stabilization unit may perform time domain filtering as the stabilization process such that the focus evaluation value of the image data of one frame which is a target is smoothed using the focus evaluation value of the image data of one previous frame or a plurality of previous frames.

Through the time domain filtering, the influence of noise or the like is removed or reduced by smoothing the focus evaluation value in the frame direction, and the focus evaluation value is made to be appropriate.

In the image processing apparatus according to the embodiment of the present technology, the evaluation value generation unit may generate the focus evaluation value for each of a plurality of blocks divided as regions from the image data of one frame which is a target. The evaluation value stabilization unit may perform time domain filtering as the stabilization process such that the focus evaluation value of each block of the image data of one frame which is a target is smoothed using the focus evaluation value of the corresponding block of the image data of one previous frame or a plurality of previous frames.

Through the time domain filtering on each block, the influence of noise or the like is removed or reduced by smoothing the focus evaluation value in the frame direction, and de focus evaluation value of each block is made to be appropriate.

In the image processing apparatus according to the embodiment of the present technology, the evaluation value generation unit may generate the focus evaluation value for each of a plurality of blocks divided as regions from the image data of one frame which is a target. The evaluation value stabilization unit may perform spatial domain filtering as the stabilization process such that the focus evaluation value of each block of the image data of one frame which is a target is smoothed using the focus evaluation value of one adjacent block or the plurality of adjacent blocks.

Through the spatial domain filtering, an excessive variation in the focus evaluation value due to noise or the like inside a screen is suppressed and the focus evaluation value of each block is made to be appropriate.

In the image processing apparatus according to the embodiment of the present technology, the stabilization parameter setting unit mar variably set the processing parameter of the stabilization process according to a noise component amount contained in the image data.

The processing parameters of the stabilization process are variably set from the fact that the proper degree of the stabilization process is different according to the noise component amount.

In the image processing apparatus according to the embodiment of the present technology, the stabilization parameter setting unit may variably set the processing parameter of the stabilization process according to manipulation information of an imaging apparatus generating image data.

In the focus information displayed through the stabilization process, slight delay occurs in the image content. However, when a manipulation of the imaging apparatus, e.g., a zoom manipulation or a pan/tilt manipulation, is performed, a relation between the position of a subject on the image and the position of the focus information such as the peaking deviates in some cases. Further, when a focus manipulation is performed, the focus evaluation value is quickly varied. Due to this, the degree of stabilization may be configured to be loose or be bypassed in some cases. Accordingly, the processing parameters of the stabilization process are variably set according to the manipulation information.

In the image processing apparatus according to the embodiment of the present technology, the stabilization parameter setting unit may variably set the processing parameter of the stabilization process according to motion information of image content detected from the image data of a plurality of frames.

When a motion of the subject is large, the relation between the position of a subject on the image and the position of the focus information such as the peaking deviates in some cases. Due to this, the degree of stabilization may be configured to be loose or be bypassed in some cases. Accordingly, the processing parameters of the stabilization process are variably set according to the motion information.

In the image processing apparatus according to the embodiment of the present technology, the display data generation unit may generate the display data in which an image indicating a focus position is added as the focus information.

That is, by displaying a shaded image or the like other than the peaking display or the focused portion as an image indicating the focused position, a focus status can be presented to the user.

In the image processing apparatus according to the embodiment of the present technology, the image data for which the focus evaluation value is generated by the evaluation value generation unit and which is the target may be image data of each frame forming the display data. The display data generation unit may generate the display data by adding the focus information to the image data of each frame forming the display data without synchronization with a frame in which the focus evaluation value which is a source of the focus information is generated.

Since the stabilization process is performed on the focus evaluation value, delay occurs for the purpose of the process. However, the delay caused due to the stabilization process of the focus evaluation value is configured not to influence the display data (for example, a subject monitoring image) altogether.

According to another embodiment of the present technology, there is provided an image processing method including: generating a focus evaluation value indicating a degree of focus of image data which is a target; performing a stabilization process on the generated focus evaluation value; and generating display data, in which focus information is added to the image data, using the focus evaluation value subjected to the stabilization process.

According to still another embodiment of the present technology, there is provided a program causing an arithmetic processing device to perform: a process of generating a focus evaluation value indicating a degree of focus of image data which is a target; a process of stabilizing the generated focus evaluation value; and a process of generating display data, in which focus information is added to the image data, using the focus evaluation value subjected to the stabilization process.

The program realizes the image processing apparatus and the image processing method described above using the arithmetic processing device.

According to embodiments of the present technology, focus information display with high reliability is enabled by suppressing noise of the focus evaluation value through a stabilization process.

Further, the advantages described herein are not necessarily limited, but any advantages described in the present disclosure may be obtained.

BRIEF DESCRIPTION OF THE DRAWINGS

FIG. 4 is a block diagram illustrating an imaging apparatus according to the embodiment;

FIGS. 6A and 6B are diagrams for describing blocks of image data and a space filter coefficient according to the embodiment.

FIG. 8 is a flowchart illustrating a focus information display process I of the imaging apparatus according to the embodiment;

FIG. 9 is a flowchart illustrating a focus information display process II of the imaging apparatus according to the embodiment;

DETAILED DESCRIPTION OF EMBODIMENTS

Figure 1:
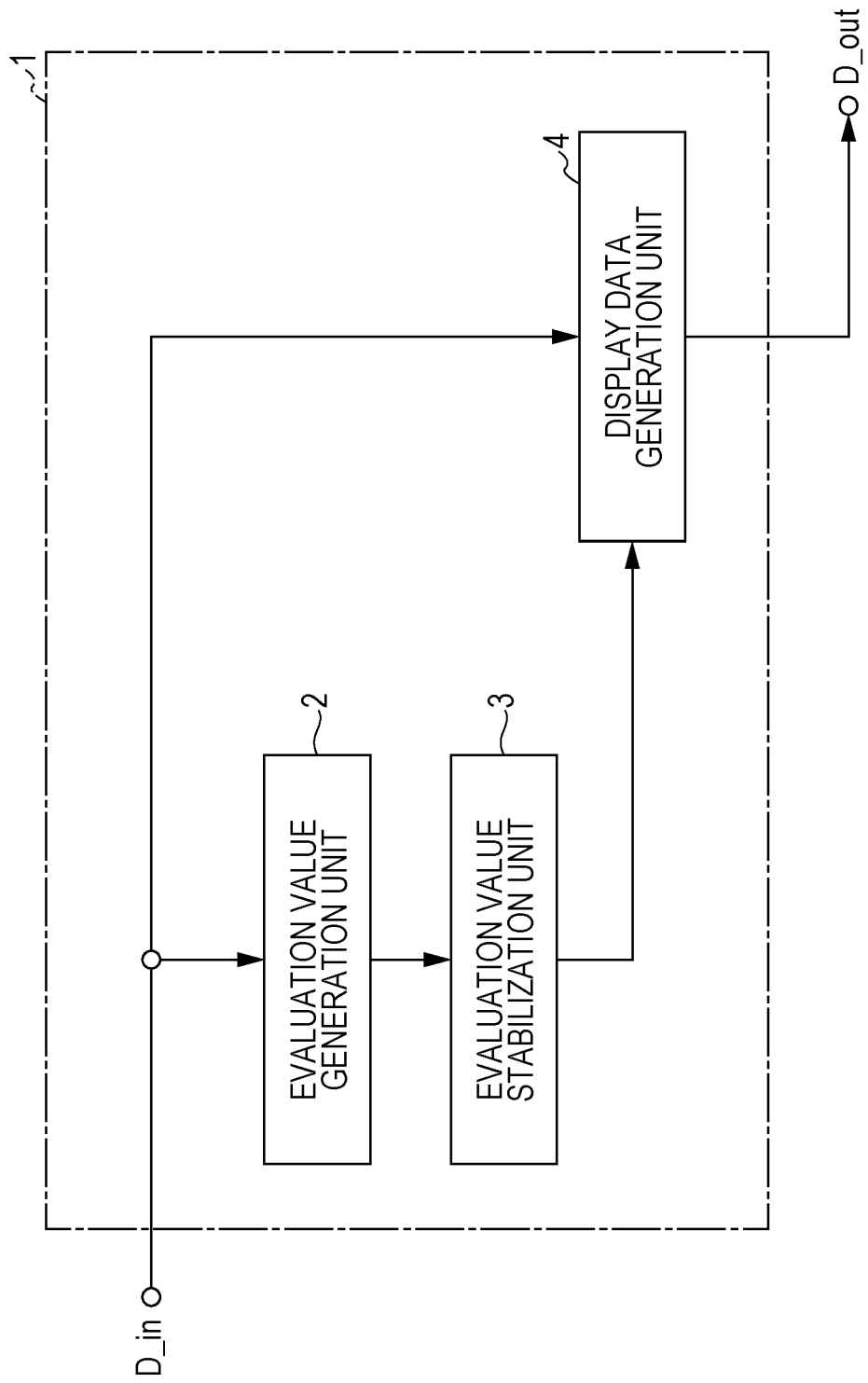
FIG. 1 is a block diagram illustrating an image processing apparatus according to an embodiment of the present technology.

Hereinafter, an embodiment will be described in the following order:
1. Configuration of Image Processing Apparatus and Processing Example According to Embodiment
2. Configuration of Imaging Apparatus
3. Focus Information Display Process I
4. Focus Information Display Process II
5. Application to Program and Computer Apparatus
6. Modification Examples 1. Configuration of Image Processing Apparatus and Processing Example According to Embodiment FIG. 1 illustrates a configuration example of an image processing apparatus 1 according to the embodiment.

The image processing apparatus 1 includes an evaluation value generation unit 2, an evaluation value stabilization unit 3, and a display data generation unit 4.

The image processing apparatus 1 generates and outputs display data D_out in which focus information is added to input image data D_in. The focus information refers to information presenting the degree of focus. The focus information is realized as, for example, enhancement display called peaking or is realized as, for example, shading of a non-focused portion. An example of the enhancement display (peaking) will be described below.

Figure 2A:
FIGS. 2A and 2B are diagrams for describing enhancement display according to the embodiment.
Figure 2B:

In the enhancement display, the edge of a focused portion in an image is enhanced and displayed and, for example, the display data D_out which is an image with an enhanced and displayed edge as in FIG. 2B is generated from the image data D_in which is a captured image as in FIG. 2A. When the display data D_out is supplied to a display apparatus (not illustrated) and the image is displayed as in FIG. 2B, a user can easily confirm a focused portion in the image data D_in. In FIG. 2B, an enhanced and displayed portion is indicated by a thick line. However, in practice, the enhancement and display is performed according to a method of increasing the luminance of the edge of a focused portion (decreasing the luminance when the entire image has high luminance), converting the color of the edge into yellow, red, or the like, or thickening the line of the edge.

In the image processing apparatus 1 in FIG. 1, the evaluation value generation unit 2 generates a focus evaluation value indicating the degree of focus of the image data D_in which is a target. The image data D_in is, for example, captured image data obtained by performing photoelectric conversion by an imager of an imaging apparatus such as a digital still camera and performing predetermined processing. The focus evaluation value refers to a value indicating the degree of focus.

The evaluation value generation unit 2 performs, for example, a process of generating a whole focus evaluation value for each frame which is the image data D_in or a process of generating a focus evaluation value for each block BK divided as a region from one frame, as will be described in FIG. 6A. The focus evaluation value also includes a blurriness evaluation value.

The evaluation value stabilization unit 3 performs a stabilization process on the focus evaluation value generated by the evaluation value generation unit 2. The stabilization process is, for example, one of limiter processing, time domain filtering, and spatial domain filtering or a combination thereof.

The display data generation unit 4 selects an enhancement and display portion in the image data D_in using the focus evaluation value stabilized by the evaluation value stabilization unit 3 and generates the display data D_out for enhancing and displaying the selected portion. For example, the portion is enhanced and displayed according to, for example, a method of increasing the luminance of pixels of a portion in which the focus evaluation value exceeds a predetermined threshold value or a method of changing color information. In this way, the display data D_out is generated and output to the display apparatus (not illustrated). Thus, the image in FIG. 2A is displayed as in FIG. 2B.

Of course, as a display form of the focus information, for example, enhancement display (peaking) of a focused portion or shading of a non-focused portion may be performed for each portion of an image. However, for example, the focus information may be obtained by calculating a whole focus evaluation value of one screen (that is, one focus evaluation value for one frame), stabilizing the focus evaluation value, and then presenting the degree of focus on a display.

Figure 3A:
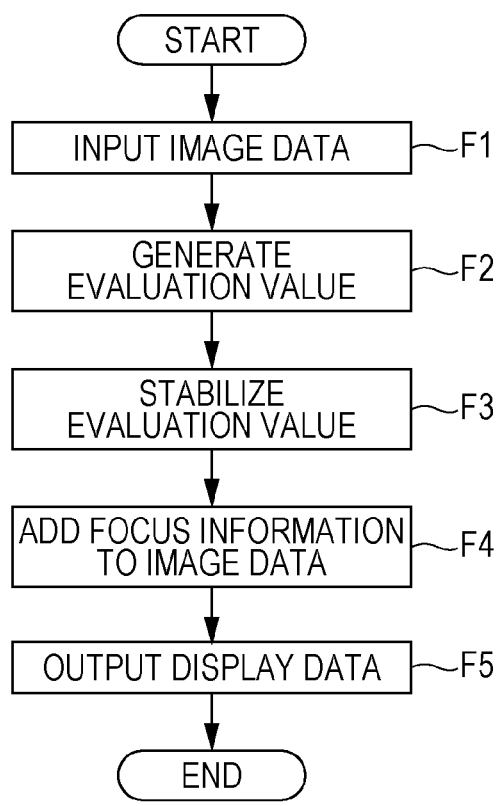
FIGS. 3A and 3B are flowcharts illustrating image processing methods according to the embodiment.
Figure 3B:
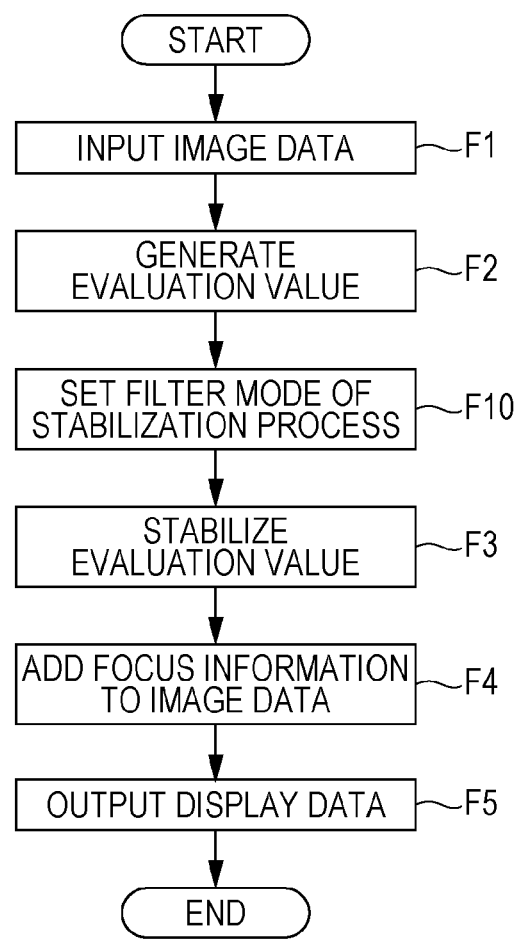

FIGS. 3A and 3B illustrate examples of processing orders by the image processing apparatus 1.

In a process in FIG. 3A, one frame of the image data D_in is first input to the image processing apparatus 1 in step F1.

In step F2, the evaluation value generation unit 2 generates, for example, a focus evaluation value indicating the degree of focus for each block BK in the image data of the one frame or one focus evaluation value for the entire frame.

In step F3, the evaluation value stabilization unit 3 performs a stabilization process on the focus evaluation value output by the evaluation value generation unit 2.

As an example of the stabilization process, there is limiter processing performed such that a difference between the focus evaluation value of the image data of one frame which is a target and the focus evaluation value of the image data of the preceding frame is set to be within a predetermined value.

When the focus evaluation value is generated for each block, limiter processing is assumed to be performed as the stabilization process such that a difference between the focus evaluation value of each block and the focus evaluation value of the corresponding block of the image data of the previous frame is within a predetermined value.

As an example of the stabilization process, time domain filtering is considered to be performed such that the focus evaluation value of the image data of one frame which is a target is smoothed using the focus evaluation value of the image data of one previous frame or a plurality of previous frames.

When the focus evaluation value is generated for each block, time domain filtering is assumed to be performed as the stabilization process such that the focus evaluation value of each block of the image data of one frame which is a target is smoothed using the focus evaluation value of the corresponding block of the image data of one previous frame or a plurality of previous frames.

As an example of the stabilization process, spatial domain filtering is considered to be performed such that the focus evaluation value of each bock for the image data of one frame which is a target is smoothed using the focus evaluation value of one adjacent block or a plurality of adjacent blocks.

In step F4, the display data generation unit 4 adds the focus information to the image data D_in using the stabilized focus evaluation value. For example, a contour line is added as enhancement and display. Thus, the display data D_out is generated. Then, in step F5, the display data generation unit 5 outputs the generated display data D_out.

FIG. 3B illustrates an example in which step F10 is added between step F2 and step F3 of FIG. 3A. In step F10, the evaluation value stabilization unit 3 sets a filter mode of the stabilization process. This is an example in which processing parameters of the stabilization process are variably set.

For example, the stabilization processing parameters are variably set according to a noise component amount contained in the image data, the stabilization processing parameters are variably set according to manipulation information of the imaging apparatus generating the image data, or the stabilization processing parameters are variably set according to motion information of image content detected from the image data of a plurality of frames.

In step F3, some or all of the limiter processing, the spatial domain filtering, and the time domain filtering are performed using the stabilization processing parameters set in step F10.

As the process of FIG. 3A or 3B by the image processing apparatus 1, as described above, the stabilized evaluation value is obtained when the evaluation value stabilization unit 3 performs the limiter processing on the focus evaluation value output from the evaluation value generation unit 2 to suppress an abrupt change in a value from the previous frame or performs the smoothing in a frame direction or a space direction through the time domain filtering and the spatial domain filtering. Then, the focus information is superimposed on the display data (for example, a captured monitoring image) using the evaluation value stabilized by smoothing the stabilized evaluation value in the space direction or the frame direction through the filter processing.

In this way, since the influence of noise contained in the focus evaluation value is suppressed through the limiter processing and the smoothing process, the focus information can be preferably displayed.

When the limiter processing and the smoothing process in the time or space direction are used together, highly stable countermeasures for noise can be performed by frame delay of a small evaluation value.

This is because a tap of the filter is lengthened when the noise is attempted to be suppressed only by the smoothing process, and thus a case in which the evaluation value is quickly changed is suppressed by a limiter and a subtle variation in the evaluation value subjected to the limiter processing is suppressed through the smoothing process.

When the process of FIG. 3B is performed, the stabilization process can be bypassed according to a circumstance or the degree of stabilization can be increased or decreased. This is because the proper degree of stabilization, or a circumstance such as a case in which the stabilization has to be performed or a case in which the stabilization may not be performed is assumed in the stabilization process in some cases.

As described above, the image processing apparatus 1 can obtain the focus information which can be easily viewed on a display apparatus and in which the influence of the noise is removed or reduced.

In the configuration of FIG. 1, the image processing apparatus 1 including the evaluation value generation unit 2, the evaluation value stabilization unit 3, and the display data generation unit 4 can be realized by, for example, a CPU (Central Processing Unit) or a DSP (Digital Signal Processor) which is an arithmetic processing device. For example, it can also be considered that units are distributed into a plurality of CPUs or a CPU, an image processing DSP, and the like to be realized and the function of the image processing apparatus 1 is realized as a cooperative process of the arithmetic processing devices.

2. Configuration of Imaging Apparatus

Hereinafter, a configuration and a process (enhancement and display of a focused portion) will be described in detail exemplifying the imaging apparatus 10 including the above-described image processing apparatus 1.

A configuration example of the imaging apparatus 10 according to the embodiment is illustrated in FIG. 4.

The imaging apparatus 10 is considered as a so-called digital still camera or digital video camera, is an apparatus that captures and records a still image or a moving image, and includes an image processing apparatus described in the summary. The imaging apparatus 10 is assumed to enhance and display a focused portion when displaying a moving image as a so-called through image (subject-monitoring image).

As illustrated in FIG. 4, the imaging apparatus 10 includes an optical system 11, an imager 12, an optical system driving unit 13, a sensor unit 14, a recording unit 15, a communication unit 16, a digital signal processing unit 20, a control unit 30, a display unit 34, and a manipulation unit 35.

The optical system 11 includes lenses such as a cover lens, a zoom lens, and a focus lens and a diaphragm mechanism. The optical system 11 condenses light from a subject on the imager (photoelectric conversion unit) 12.

The imager 12 includes, for example, an imaging element, such as a CCD (Charge Coupled Device) element or a CMOS (Complementary Metal Oxide Semiconductor) element, in which photoelectric conversion pixels are arrayed in a matrix form.

The imager 12 performs, for example, a CDS (Correlated Double Sampling) process and an AGC (Automatic Gain Control) process on an electric signal obtained through the photoelectric conversion in the imaging element and also performs an A/D (Analog/Digital) conversion process. Further, a captured image signal (hereinafter referred to as captured image data) which is digital data is output to the digital signal processing unit 20 on the rear stage.

The optical system driving unit 13 drives the focus lens in the optical system 11 to perform a focus operation under the control of the control unit 30. Further, the optical system driving unit 13 drives the diaphragm mechanism in the optical system 11 to perform exposure adjustment under the control of the control unit 30. Furthermore, the optical system driving unit 13 drives the zoom lens in the optical system 11 to perform a zoom operation under the control of the control unit 30.

In regard to the focus lens, not only is driving performed as auto focus of controlling an operation of the optical system driving unit 13 by the control unit 30 in response to detection of a focus state of a captured image, but also driving is performed as manual focus of controlling an operation of the optical system driving unit 13 by the control unit 30 in response to a manipulation of a focus manipulator which is a user.

The digital signal processing unit 20 is configured as an image processor including, for example, a DSP (Digital Signal Processor). The digital signal processing unit 20 performs various kinds of signal processing on a digital signal (captured image data) from the imager 12.

For example, the digital signal processing unit 20 includes a preprocessing unit 21, a synchronization unit 22, a YC generation unit 23, a resolution conversion unit 24, a codec unit 25, a display data generation unit 26, a focus evaluation processing unit 27, and a motion detection unit 28.

The preprocessing unit 21 performs a clamp process of clamping black levels of R, G, and B at a predetermined level on the captured image data from the imager 12 or a correction process between color channels of R, G, and B.

The synchronization unit 22 performs demosaic processing so that image data regarding each pixel includes all color components of R, G, and B.

The YC generation unit 23 generates (separates) a luminance (Y) signal and a color (C) signal from the image data of R, G, and B.

The resolution conversion unit 24 performs a necessary resolution conversion process, e.g., recording or communication output resolution conversion, on the image data subject to various kinds of signal processing.

The codec unit 25 performs, for example, a recording or communication encoding process on the image data subjected to the resolution conversion.

The display data generation unit 26 generates, for example, display data as a through image to be output to the display unit 34 under the control of the control unit 30.

The display data generation unit 26 obtains, for example, display data as a through image by further performing display resolution conversion on the image data subjected to the resolution conversion for the recording by the resolution conversion unit 24. The display data generation unit 26 performs resizing (expanding or contracting) in accordance with a display size of the display unit 34 in some cases.

For example, when a user searches for a subject to capture and record a still image or stands by to record a moving image, the display data generation unit 26 generates display data for through image display based on the captured image data. Then, the display data is supplied to the display unit 34 and through image display is performed.

The display data generation unit 26 also performs a process of enhancing and displaying (peaking) a focused portion as focus information display. For example, image processing is performed to select a portion with a high focus evaluation value on the image data which is a through image, enhance pixels included in the portion on the display unit 34, and present the portion to the user. For example, the enhancement and display is performed according to a method of detecting a focused portion on the captured image data, as in FIG. 2A, and increasing the luminance of the focused portion and the detected pixels, as in FIG. 2B, or changing color information. By generating the display data subjected to the enhancement and display and displaying the display data on the display unit 34, the user can easily and accurately confirm the focus (confirm the focused portion and the focus state). For example, the user adjusts focus using a manual focus or auto focus function viewing the enhancement and display. Then, when the edge of an intended subject portion is enhanced, the subject portion is determined to be in focus and capturing and recording a still image or recording a moving image can start.

The focus evaluation processing unit 27 generates a focus evaluation value for the purpose of focus information display such as the above-described peaking. In particular, in the present example, the focus evaluation processing unit generates the focus evaluation value for each frame of the image data and also performs a stabilization process on the focus control value. The focus evaluation processing unit supplies the stabilized focus evaluation value to the display data generation unit 26 so that the display data generation unit 26 can perform a process for focus information display based on the stabilized focus evaluation value.

The motion detection unit 28 detects a motion status of a subject indicated by the captured image data. For example, motion detection unit 28 detects the magnitude of a motion of a subject image from a difference in an image of each frame.

The motion detection unit 28 performs an image analysis process in units of frames, for example, on a captured image signal (luminance signal/color signal) obtained by the YC generation unit 23 to obtain a motion vector (local vector) of each of a plurality of areas divided from a screen. Further, a vector (global vector) of a whole image is obtained from the local vectors in some cases.

The motion detection unit 28 transmits and receives the detected local vectors or global vector as motion information to and from the control unit 30.

In the example of FIG. 4, the display data generation unit 26, the focus evaluation processing unit 27, and the motion detection unit 28 are configured as functions performed by the digital signal processing unit 20, but this is merely an example. For example, the control unit 30 can be considered to perform a process of each unit.

The control unit 30 is configured by a microcomputer (arithmetic processing device) including a CPU (Central Processing Unit), a ROM (Read-Only Memory), a RAM (Random Access Memory), and a flash memory.

When the CPU executes a program stored in the ROM, the flash memory, or the like, the entire imaging apparatus 10 is generally controlled.

The RAM is used as a working area at the time of processing of various kinds of data by the CPU to temporarily store data, a program, or the like.

The ROM or the flash memory (non-volatile memory) is used to store not only an OS (Operating System) operating for the CPU to control each unit or content files such as image files, but also application programs for various operations, firmware, or the like. In the present example, in particular, a program for executing a process for resolution mode switching of the imager 12 is also stored.

The control unit 30 controls an operation of each necessary unit in regard to parameter control of various kinds of signal processing in the digital signal processing unit 20, an imaging operation or a recording operation in response to a manipulation of a user, a reproduction operation for a recorded image file, a camera operation such as zoom, focus, or exposure adjustment, a user interface operation, and the like.

In the case of the embodiment, the control unit 30 has a function of a stabilization parameter setting unit 30a in regard to the stabilization process for the focus evaluation value in the focus evaluation processing unit 27 described above.

The stabilization parameter setting unit 30a detects and recognizes a manipulation status of the user on the imaging apparatus 10, a noise status of an image, and motion information of an image. Then, the stabilization parameter setting unit 30a instructs the focus evaluation processing unit to set a stabilization coefficient according to the result.

The stabilization parameter setting unit 30a may be realized as a function of the digital signal processing unit 20.

The display unit 34 is a display unit that performs various kinds of display for the user (an imaging person or the like) and is configured to include, for example, a display device such as an LCD (Liquid Crystal Display) or an organic EL (Electro-Luminescence) display formed on the casing of the imaging apparatus 10. Further, the display unit may be formed in the form of a so-called viewfinder using an LCD, an organic EL display, or the like.

The display unit 34 is configured to include the foregoing display device and a display driver causing the display device to perform display. The display driver performs various kinds of display on the display device based on an instruction of the control unit 30. For example, the display driver reproduces and displays a still image or a moving image captured and recorded on a recording medium or displays a through image, which is a moving image formed by the captured image data of each frame imaged during standby of a release (shutter manipulation) according to the display data from the display data generation unit 26, on a screen of the display device. The enhancement and display of the through image is also performed. Further, various manipulation menus, icons, messages, and the like, i.e., GUIs (Graphical user Interfaces) are displayed on a screen.

The manipulation unit 35 has an input function of inputting a manipulation of a user and transmits a signal according to the input manipulation to the control unit 30.

The manipulation unit 35 is realized by, for example, various manipulators provided on the casing of the imaging apparatus 10 or a touch panel or the like formed on the display unit 34.

As the manipulators on the casing, a reproduction menu activation button, a decision button, a cross key, a cancellation button, a zoom key, a slide key, a shutter button (release button), a focus ring which is a manipulator for manual focus, and the like are provided.

Various manipulations may be performed by touch panel manipulations using icons, menus, and the like displayed on the touch panel and the display unit 34.

The recording unit 15 is configured by, for example, a non-volatile memory and functions as a storage region storing an image file (content file) such as still image data or moving image data, attribute information of the image file, a thumbnail image, and the like.

The image file is stored, for example, in a form of the JPEG (Joint Photographic Experts Group), the TIFF (Tagged Image File Format), the GIF (Graphics Interchange Format), or the like.

Various actual forms of the recording unit 15 can be considered. For example, the recording unit 15 may be a flash memory included in the imaging apparatus 10 or may be formed in the form of a memory card (for example, a portable flash memory) detachably mounted on the imaging apparatus 10 and a card recording and reproducing unit that performs recording and reproducing access on the memory card. Further, as the built-in form of the recording unit in the imaging apparatus 10, the recording unit can also be realized as an HDD (Hard Disk Drive) or the like.

In the present example, the recording unit 15 may store a program for causing the digital signal processing unit 20 or the control unit 30 to perform processes of the focus evaluation processing unit 27 and the display data generation unit 26 to be described below or the process of the stabilization parameter setting unit 30a.

The communication unit 16 performs data communication or network communication with an external apparatus in a wired or wireless manner.

For example, the communication unit 16 communicates the captured image data (a still image file or a moving image file) with an external display apparatus, an external recording apparatus, an external reproducing apparatus, or the like. Further, as a network communication unit, for example, the communication unit 16 may perform communication over various networks such as the Internet, a home network, and a LAN (Local Area Network) to transmit and receive various kinds of data to and from servers, terminals, or the like on the networks.

For example, the communication unit 16 can also transmit display data which is a through image or a reproduction image to an external display apparatus so that the display data is displayed. That is, various kinds of display in the display unit 34 may be configured to be performed by an external display apparatus.

The sensor unit 14 generally indicates various sensors. For example, a gyro sensor (angular velocity sensor), an acceleration sensor, and the like are provided to detect a motion of the whole imaging apparatus 10, such as camera shake, or a posture, movement, or the like (pan movement, tilt movement, or the like) of the imaging apparatus 10.

An illuminance sensor detecting external illuminance for exposure adjustment or the like and a ranging sensor measuring a subject distance may be provided.

As the sensor unit 14, a zoom lens position sensor detecting the position of the zoom lens in the optical system 11 or a focus lens position sensor detecting the position of the focus lens is provided in some cases.

As the sensor unit 14, a sensor detecting an opening amount of a mechanical iris (diaphragm mechanism) is provided in some cases.

Each of the various sensors of the sensor unit 14 delivers each of the detected information to the control unit 30. The control unit 30 can perform various kinds of control using the information detected by the sensor unit 14.

A flow of a process on the focus evaluation value in the imaging apparatus 10 will be described with reference to the block diagram of FIG. 5.

Figure 5:
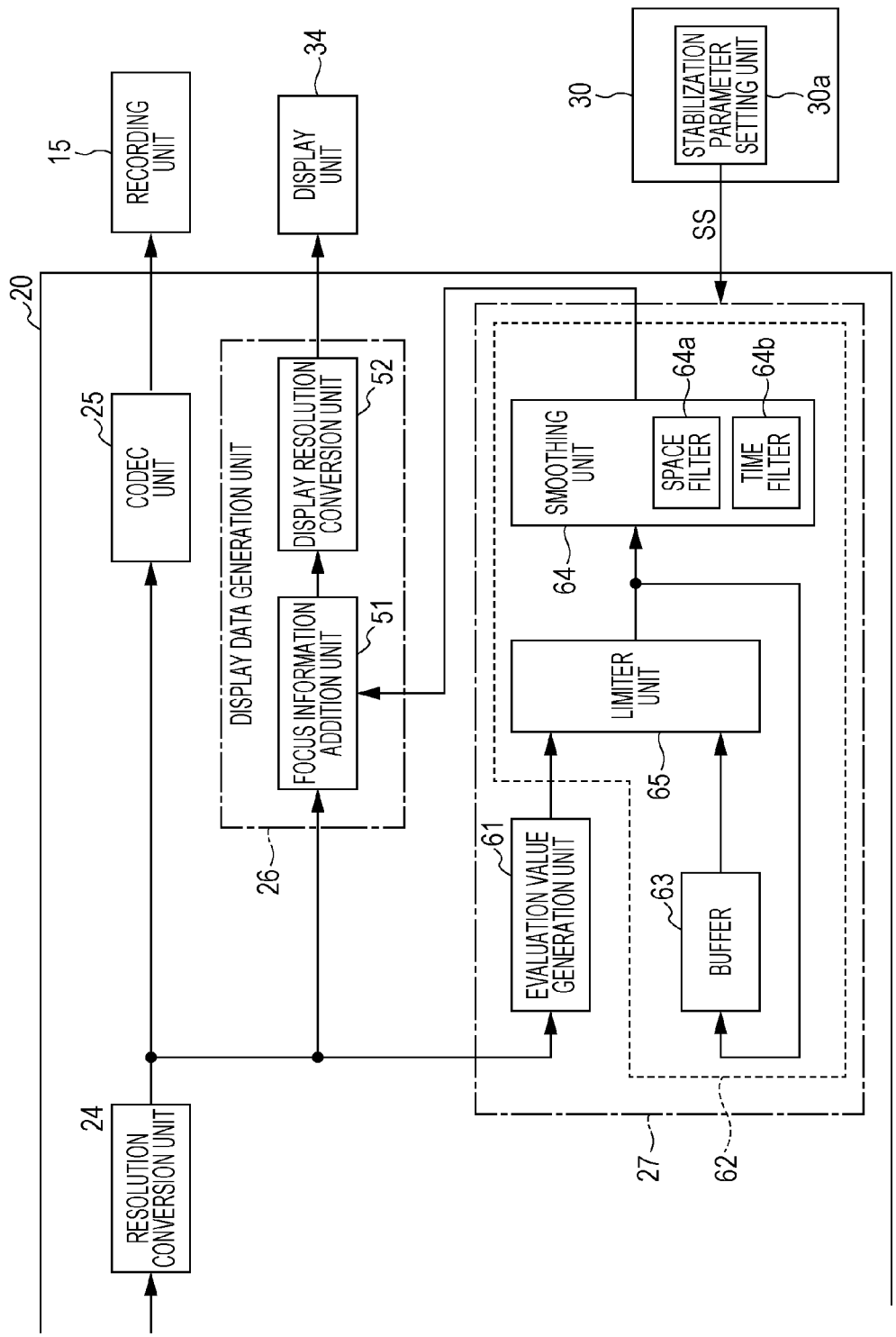
FIG. 5 is a block diagram illustrating a process relevant to a focus evaluation value according to the embodiment.

FIG. 5 illustrates the resolution conversion unit 24, the codec unit 25, the display data generation unit 26, and the focus evaluation processing unit 27 in the digital signal processing unit 20 and illustrates the recording unit 15, the display unit 34, and the stabilization parameter setting unit 30a of the control unit 30.

During a period in which a still image is recorded or a moving image is recorded for a given frame, for example, image data of which a resolution is converted for recording by the resolution conversion unit 24 is encoded by the codec unit 25 and is recorded in the recording unit 15.

On the other hand, during a period (a period until a shutter manipulation is performed) until recording of a still image or a moving image recording period, a through image is displayed. During the period in which the through image is displayed, the image data output from the resolution conversion unit 24 is supplied to the display data generation unit 26 and is converted into display data. Specifically, the display data generation unit 26 has processing functions of a focus information addition unit 51 and a display resolution conversion unit 52. The image data from the resolution conversion unit 24 is subjected to a focus information addition process of an edge image or the like as peaking by the focus information addition unit 51, is then subjected to resolution conversion by the display resolution conversion unit 52 in accordance with a display region of the display unit 34, and is supplied as the display data to the display unit 34.

Here, the image data from the resolution conversion unit 24 is also supplied to the focus evaluation processing unit 27.

The focus evaluation processing unit 27 includes an evaluation value generation unit 61 and an evaluation value stabilization unit 62, as illustrated in the drawing. The evaluation value stabilization unit 62 includes a limiter unit 65, a buffer 63, and a smoothing unit 64.

The evaluation value generation unit 61 generates focus evaluation values indicating the degree of focus using the image data of the frames sequentially input from the resolution conversion unit 24 as targets.

In particular, the evaluation value generation unit 61 performs a process of generating a focus evaluation value for each of blocks BK divided as a plurality of regions from the inside of an image of one frame, as in FIG. 6A, on the image data of each frame. Accordingly, the focus evaluation values corresponding to the number of blocks BK are generated for one frame and are supplied to the limiter unit 65. The blocks BK are assumed to be a group of a plurality of pixels adjacent to each other.

Various methods of generating the focus evaluation values are considered and the following process is performed as an example.

For example, a Y signal is simply generated for each pixel data forming the block BK. Then, high-pass extraction is performed on the generated Y signal by an HPF (High-Pass Filter) and absolute value processing is performed. That is, a high-pass component is extracted as an absolute value. Then, after high-pass noise removal or the like is performed, an integration process is performed. That is, high-pass components of the pixel data forming the block BK are integrated for each block BK and the focus evaluation value are consequently obtained.

Since the edge component is shown considerably in a focused region, an integrated value of the high-pass components becomes a high value. Accordingly, when the integrated value is set as the focus evaluation value, the focus evaluation value is a value indicating the degree of focus for the block BK.

In the evaluation value stabilization unit 62, the limiter unit 65 performs the limiter processing.

The focus evaluation value of each block BK which is an output of the limiter processing is configured to be stored in the buffer 63 and is configured to be supplied to the limiter unit 65 after one frame. Thus, the limiter unit 65 is configured such that the focus evaluation value of each block BK from the evaluation value generation unit 61 is compared with the focus evaluation value of each block BK after the limiter processing obtained for the image data before one frame.

For example, the limiter processing is performed as follows:

When "V_raw" is assumed to be a raw focus evaluation value (the focus evaluation value obtained by the evaluation value generation unit 61), "V_previous" is assumed to be a focus evaluation value of a previous frame, "V_current" is assumed to be a focus evaluation value of a current frame, and "E" is assumed to be a limit width, "V_current=V_previous+E" is set for the case of "V_current>V_previous+E,"

"V_current=V_previous−E" is set for the case of "V_current<V_previous−E", and

V_current=V_raw is set for the other cases.

In the case of the limiter processing of each block BK as in the present example, the foregoing equations can be expressed using "V_raw(p)," "V_previous(p)," and "V_current(p)" on the assumption that "p" is a coordinate position of each block.

That is, in the limiter processing, a difference between the focus evaluation value of the current frame for each block BK and the focus evaluation value after the limiter processing on the corresponding block of the previous frame is set to be limited within the limit width B which is a predetermined value. When the difference is within the limit width E, the raw focus evaluation value V_raw(p) is considered as the focus evaluation value V_current (p) of the current frame without change.

The focus evaluation value V_current (p) of each block BK subjected to the limiter processing by the limiter unit 65 is supplied to the smoothing unit 64 and is stored as a focus evaluation value V_previous (p) of the previous frame for the image data of a subsequent frame in the buffer 63.

The smoothing unit 64 includes a space filter 64a and a time filter 64b.

As the stabilization process, the space filter 64a smooths the focus evaluation value (V_current(p)) of each block BK of the image data of one frame, which is a target, using the focus evaluation value of one adjacent block or a plurality of adjacent blocks. This process can be said to be low-pass filter process in a so-called space direction.

For example, the focus evaluation value of each block BK is smoothed using the focus evaluation value of one neighboring block or a plurality of neighboring blocks such as the blocks adjacent in the horizontal direction of each image, the blocks adjacent in the vertical direction, or the peripheral blocks.

A specific example will be described. When "V_in" is assumed to be a focus evaluation value of each block input to the space filter 64a, "V_out" is assumed to be a focus evaluation value of each block output from the space filter 61a, and "a" is assumed to be a filter coefficient matrix, calculation is performed using V_out=a*V_in. Here, "*" indicates a convolution calculation. For example, the filter coefficient matrix a is set as in FIG. 6B.

FIG. 6B illustrates an example in which diagonal lines are given to a block BK which is a target and coefficients of 25 blocks BK including the block BK and the peripheral blocks are set to, for example, (1/25).

That is, the focus evaluation value V_in of each of the input blocks BK is smoothed by reflecting the value of 1/25 of the focus evaluation value V_in of each of the 25 blocks including the block BK itself and the peripheral blocks, and the focus evaluation value V_out is considered as an output of the space filter 64a.

Next, as the stabilization process, the time filter 64b of the smoothing unit 64 smooths the focus evaluation value of the image data of one frame, which is a target, using the focus evaluation value of the image data of one previous frame or a plurality of previous frames. In the case of the process in units of blocks BK as in the present example, the time filter 64b smooths the focus evaluation value of each block of the image data of one frame, which is a target, using the focus evaluation value of the corresponding block of the image data of one previous frame or a plurality of previous frames.

Specifically, the time filter 64b can be realized by a low-pass filter which is the following FIR (Finite Impulse Response) filter or IIR (Infinite Impulse Response) filter.

First, the case of the FIR filter will be described. It is assumed that "n" is a current frame number, "V(N)" is a focus evaluation value of an n-th frame, "V_out" is a focus evaluation value stabilized and output by the time filter 64b, and Coeff=[c0 c1 c2] (where numbers indicate previous frames) is a smoothing coefficient. For example, "V_out=c0×V(n)+c1×V(n−1)+c2×V(n−2)" is set.

For example, when "c0=c1=c2=⅓" is set, a focus evaluation V_out smoothed using 3 previous frames can be obtained.

When c0=c1=c2=⅓, the phase of the focus evaluation value is delayed by one frame (0 frame delay×0.33+1 frame delay×0.33+2 frame delay×0.33=1 frame delay).

When "c0=1" and "c1=c2 0" are set, the phase of the focus evaluation value is not delayed (0 frame delay×1+1 frame delay×0+2 frame delay×0=0). This means that the filter is bypassed.

Next, the case of the IIR filter will be described. It is assumed that "n" is a current frame number, "V(n)" is a focus evaluation value of an n-th frame, "V_out(n)" is a focus evaluation value stabilized and output by the time filter 64b, and Coeff=[cr] (where cr<1.0) is a smoothing coefficient (return ratio).

In this case, "V_out(n)=cr×V_out(n−1)+(1.0−cr)×(n)" is set.

As "cr" is closer to 1, a time constant is larger. Therefore, since the degree of stabilization increases, proper "cr" is set.

As "cr" is closer to 1 and the degree of stabilization increases, a response to change is slower. When "cr" is set to 0, delay does not occur in the output evaluation value (an input=an output), but this means that the filter is bypassed.

For example, as described above, the smoothing unit 64 performs the stabilization process by the space filter 64a or performs the stabilization process by the time filter 64b. Then, the focus evaluation value of each block BK stabilized by the smoothing unit 64 is supplied to the focus information addition unit 51 in the display data generation unit 26.

The focus information addition unit 51 adds the focus information to the image data as a monitoring image based on the focus evaluation value of each of the input blocks BK.

The filter coefficient (filter coefficient matrix a) of the space filter 64a and the filter coefficient (smoothing coefficient Coeff) of the time filter 64b in the smoothing unit 64 and the limit width E of the limiter unit 65 can be varied according to an instruction SS from the stabilization parameter setting unit 30a. This point will be described below.

3. Focus Information Display Process I

In the imaging apparatus 10 according to the embodiment, the focus evaluation processing unit 27, as in FIG. 5, includes the evaluation value generation unit 61 and the evaluation value stabilization unit 62. Based on the focus evaluation value obtained by these units, the display data generation unit 26 adds the focus information to the image data as a through image (monitoring image).

First, the use meaning of the configuration illustrated in FIG. 5 will be described with reference to FIGS. 7A to 7E.

For example, in the imaging apparatus 10 of the present example, as the peaking (enhancement and display) function, the user can confirm a state of focus by estimating the degree of focus from the captured image data and displaying the focus information on the monitoring image for each region in a superimposing manner.

In this case, the focus evaluation value is disturbed due to noise contained in the captured image data in some cases.

Accordingly, in the embodiment, the time filter 64b or the limiter unit 65 described above smooths the focus evaluation values themselves using the focus evaluation value of the plurality of frames or the space filter 64a spatially performs the smoothing in the frames, so that the influence of the noise is reduced and the disturbance of the focus information display is prevented.

Figure 7A:
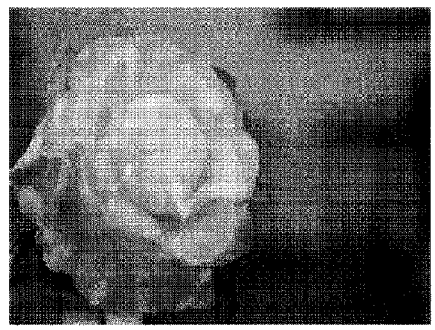
FIGS. 7A to 7E are diagrams for describing peaking display examples according to the embodiment and a comparative example.

FIG. 7A illustrates an image by original captured image data. The image is an input image input to the focus evaluation processing unit 27 to generate the focus evaluation value.

Figure 7B:
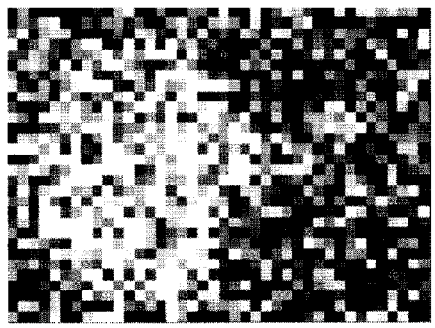

In this case, the raw focus evaluation value of each block BK through high-frequency component detection obtained by the evaluation value generation unit 61 is illustrated in FIG. 7B.

In FIG. 7B, one square is one block BK. White indicates focus (the focus evaluation value is high) and black indicates non-focus (the focus evaluation value is low). As the block BK is closer to white, the degree of focus is higher.

As understood from FIG. 7B, the raw focus evaluation values can be said to be extreme scores since excessively varied portions are abundant even in the adjacent blocks BK.

Figure 7D:
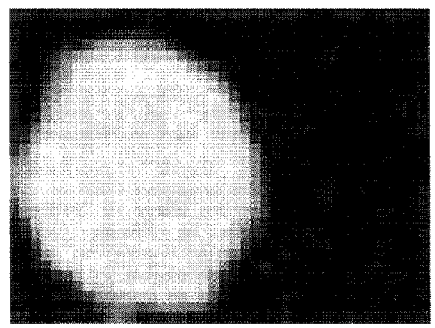
Figure 7C:
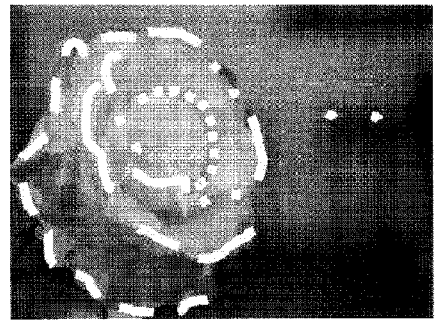

When the peaking display is performed based on the raw focus evaluation value, a result illustrated in FIG. 7C is obtained. That is, marker lines (indicated by thick lines) of focused portions may seem to be shaken or interrupted or irregularly blink, or fine marker lines may occur in out of focus portions.

On the other hand, the focus evaluation value obtained by the evaluation value generation unit 61 and stabilized by the evaluation value stabilization unit 62 is illustrated in FIG. 7D. The extreme scores disappear by the stabilization in the space direction and the time direction.

Figure 7E:
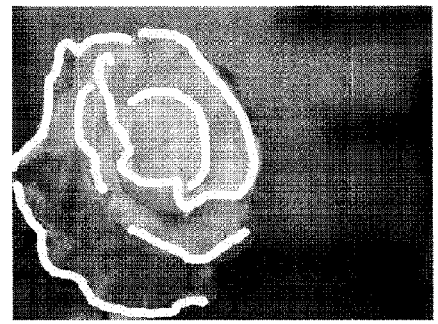

When the peaking display is performed based on the stabilized focus evaluation value, marker lines are displayed accurately in focused portions as in FIG. 7E. By such display, the user can clearly recognize a subject in focus.

In the embodiment, the process of the evaluation value stabilization unit 62 is performed for the purpose of the accurate focus information display.

A focus information display process I performed by the digital signal processing unit 20 is illustrated in FIG. 8. This process is performed by the digital signal processing unit 20 in the configuration described in FIG. 5.

The focus information display process I is an example in which the stabilization processing parameters are fixed. For example, the stabilization processing parameters generally refer to parameters such as filter coefficients used for each stabilization process, such as the limit width E, the filter coefficient matrix a, and the smoothing coefficient Coeff described above. When the stabilization processing parameters are fixed, the stabilization parameter setting unit 30a of the control unit 30 becomes unnecessary. An example in which the stabilization processing parameters are changed will be described as a focus information display process II.

In the focus information display process I of FIG. 8, in step F101, the process of the digital signal processing unit 20 is first divided according to whether the focus information display is being performed. The focus information display is performed or not performed according to an instruction by the control unit 30. When the focus information display is not performed, processes of steps F101 to F107 are bypassed.

For example, when the focus information display is being performed as the peaking display, the digital signal processing unit 20 repeatedly performs the processes of steps F102 to F107.

In step F102, the focus evaluation processing unit 27 and the display data generation unit 26 first acquire a monitoring image of one frame from the resolution conversion unit 24.

In step F103, the evaluation value generation unit 61 of the focus evaluation processing unit 27 generates the focus evaluation value for each block BK of the frame.

Then, in step F104, the limiter unit 65 of the evaluation value stabilization unit 62 performs the above-described limiter processing on the focus evaluation value of each block BK.

In step F105, the focus evaluation value output in the limiter processing is received in the buffer 63 for the purpose of the limiter processing of a subsequent frame.

In step F106, the smoothing unit 64 further performs the smoothing process on the focus evaluation value of each block BK subjected to the limiter processing. For example, both of the process of the space filter 64a and the process of the time filter 64b are performed.

Thus, after the focus evaluation value is generated, the focus evaluation value is stabilized through the limiter processing, the spatial domain filtering, and the time domain filtering. Then, in step F107, the focus evaluation value is supplied to the display data generation unit 26. In the display data generation unit 26, based on the supplied focus evaluation value, the focus information addition unit 51 adds the focus information to the monitoring image data input at this time. For example, a process of superimposing the marker lines as peaking on the monitoring image data is performed.

Since delay occurs in the process of generating or stabilizing the evaluation value, the focus information addition unit 51 adds the focus information to a later frame F(y) using the evaluation value generated and stabilized for a given frame F(x).

Since the process of the time filter 64b or the limiter unit 65 performs the stabilization by reflecting the focus evaluation values of previous frames F(x−1), F(x−2), etc. of the given frame F(x), the focus information obtained from the frames F(x), F(x−1), F(x−2), etc. is added to the frame F(y).

In the embodiment, the generation of the focus evaluation value and the addition of the focus information are not synchronized. This is because when the monitoring image data is delayed for the purpose of the synchronization on the side of the display data generation unit 26, the monitoring image itself displayed on the display unit 34 may be considerably delayed from the actual subject status and the monitoring image may become an image giving an uncomfortable feeling to the user of the imaging apparatus or causing a shutter chance to be rarely confirmed.

In the embodiment in which the focus information display process I is performed, the following advantages can be obtained.

The imaging apparatus 10 according to the embodiment includes the evaluation value generation unit 61 generating the focus evaluation value indicating the degree of focus of the image data which is a target, the evaluation value stabilization unit 62 performing the stabilization process on the focus evaluation value generated by the evaluation value generation unit 61, and the display data generation unit 26 generating the display data in which the focus information is added to the image data using the focus evaluation value subjected to the stabilization process by the evaluation value stabilization unit 62.

In the configuration, by performing the focus information display using the stabilized focus evaluation value, it is possible to realize the accurate focus information display for the user. For example, the display illustrated in FIG. 7E for which the marker lines are interrupted or there is no noise display can be realized as the peaking display.

Since the focus information display with high reliability can be performed, the user can easily perform a focusing manipulation or a focus confirmation manipulation.

In the imaging apparatus 10 according to the embodiment, the evaluation value generation unit 61 generates the focus evaluation value for each of the plurality of blocks BK divided as regions from the image data of one frame which is a target. Thus, it is possible to obtain the focus evaluation value for each region (block) of the image data of one frame, perform the stabilization process on the focus evaluation value, and then display the focus information for each block. For example, from the viewpoint of generating the focus evaluation value for the purpose of presenting the degree of focus of each portion as in the peaking, the process of each block BK is preferable.

Further, the block BK is a collection of a plurality of given pixels, but "one pixel=one block" may also be set.

In the imaging apparatus 10 according to the embodiment, the limiter processing is performed as the stabilization process such that the difference between the focus evaluation value of each block BK of the image data of one frame which is a target and the focus evaluation value of the corresponding block BK of the image data of the previous frame is within the predetermined value. Through the limiter processing, the focus evaluation value of each block BK can be configured not to be quickly varied due to the influence of noise or the like.

In the imaging apparatus 10 according to the embodiment, the time domain filtering is performed as the stabilization process such that the focus evaluation value of each block BK of the image data of one frame which is a target is smoothed using the focus evaluation value of the corresponding block BK of the image data of one previous frame or the plurality of previous frames. Through the time domain filtering, the influence of noise or the like can be removed or reduced by smoothing the focus evaluation value in the frame direction and the focus evaluation value of each block BK can be made to be appropriate. In particular, the noise suppression effect is high in the time domain filtering.

In the imaging apparatus 10 according to the embodiment, the spatial domain filtering is performed as the stabilization process such that the focus evaluation value of each block of the image data of one frame which is a target is smoothed using the focus evaluation value of one adjacent block or the plurality of adjacent blocks. Through the spatial domain filtering, an excessive variation in the focus evaluation value due to noise or the like inside a screen can be suppressed and the focus evaluation value of each block BK can be made to be appropriate.

In particular, in the embodiment, as described with reference to FIGS. 5 and 8, the evaluation value is roughly stabilized by performing the limiter process on the focus evaluation value of each block BK to suppress the abrupt variation in the value from the previous frame (process a), the further stabilized evaluation value is obtained by smoothing the roughly stabilized evaluation value in the space direction and the frame direction through the filter processing (process b), and the superimposition of the focus information on the monitoring image is controlled using the stabilized evaluation value (process c).

Thus, by suppressing the influence of noise contained in the focus evaluation value through both of the limiter processing and the smoothing process, preferable display is realized.

By using the limiter processing and the smoothing process in the direction together, highly reliable countermeasures against the noise can be made by slight frame delay of the focus evaluation value. This is because the abrupt variation in the focus evaluation value can be suppressed by the limiter processing and the subtle variation in the focus evaluation value subjected to the limiter processing can be suppressed by the smoothing process.

To obtain the same suppression effect only through the smoothing process, it is necessary to considerably increase the number of taps of the time filter 64b.

In the smoothing process which is the foregoing (process b), a nonlinear filter such as a median filter or an epsilon filter may be used instead of the low-pass filter.

In the foregoing (process c), the display data generation unit 26 generates the display data in which the image indicating the focus position is added as the focus information. Specifically, the example in which the marker lines of the peaking are superimposed on the image has been described. However, for example, another focus information display may be performed so that a shading process is performed on a non-focused portion.

In the case of the embodiment, the display data generation unit 26 generates the display data by adding the focus information to the image data of each frame forming the display data without synchronization with the frame in which the focus evaluation value which is a source of the focus information is generated.

That is, the focus evaluation value stabilized as described above is delayed in a time (frame) compared to the monitoring image, but this delay is allowed and the monitoring image is configured not to be delayed for the purpose of synchronization.

This is because the delay of the monitoring image deteriorates operability of the imaging apparatus (in particular, a framing manipulation or a shutter manipulation). For a focusing manipulation, the influence of the delay on the manipulation property is less than in the framing manipulation or the shutter manipulation. Therefore, strong stabilization can be performed while allowing delay to some extent only for the focus information display. In other words, the delay caused due to the stabilization is configured not to influence the monitoring image itself.

4. Focus Information Display Process II

Next, an example in which the stabilization processing parameters are varied will be described as the focus information display process II.

The modes of the limiter unit 65, the space filter 64a, and the time filter 64b are set by the stabilization processing parameters. Changing the stabilization processing parameters is referred to as a change in the filter mode.

FIG. 9 illustrates the focus information display process II of performing a change process in the filter mode. Since steps F101 to F107 are the same as those of FIG. 8 described above, the repeated description will not be made. In this case, a process of setting the filter mode is added as step F110 between steps F103 and F104.

The filter mode setting is a process of variably setting some or all of the filter coefficients (filter coefficient matrix a) of the space filter 64a, a filter coefficient (smoothing coefficient Coeff) of the time filter 64b, and the limit width E of the limiter unit 65.

The variable setting is instructed to the digital signal processing unit 20 by the function of the stabilization parameter setting unit 30a of the control unit 30.

First, a specific example of the variable setting of the stabilization parameter will be described.

For example, in regard to the limit width E of the limiter unit 65, the limit width E itself is changed. As the limit width E becomes larger, the limiter effect decreases. By setting the limit width to a large value to some extent, the limiter processing can also be actually bypassed. In contrast, as the limit width E is closer to 0, the limiter effect increases.

Therefore, it can be considered that limit width E1 to E2 are set as target ranges and the limit width E1 to E2 is changed at two stages or the limit width E1 to E2 is changed at multiple stages. For example, validity and invalidity of stabilization can be switched by the limiter unit 65 and the stabilization effect by the limiter unit 65 can be switched to four high, mid, low, and invalid stages.

The space filter 64a changes a valid coefficient range or a coefficient value of the filter coefficient matrix a.

Figure 10:
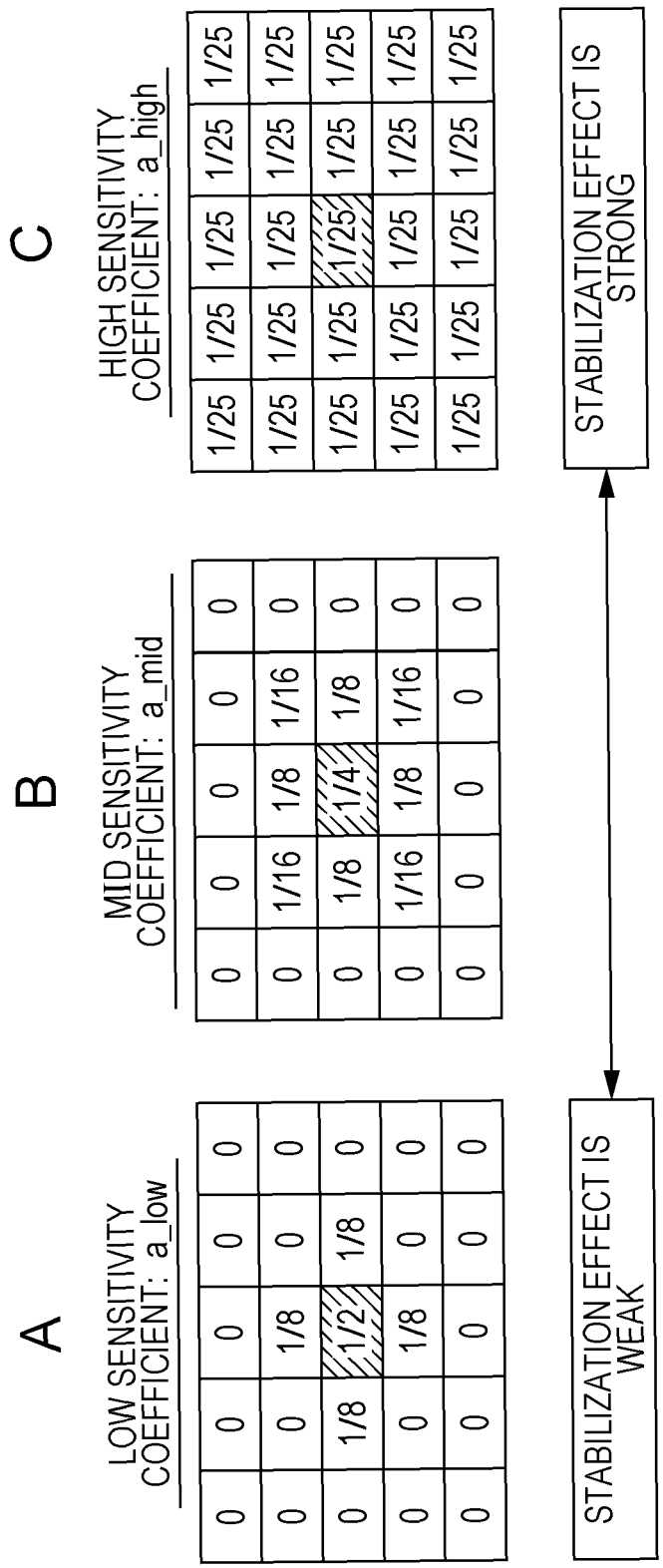
FIG. 10 is a diagram for describing space filter coefficients according to the embodiment.

For example, three kinds of filter coefficient matrixes a_low, a_mid, and a_high are prepared, as in FIG. 10.

The filter coefficient matrix a_high in C of FIG. 10 is configured to be the same as the example illustrated in FIG. 6B and is a parameter that realizes a space low-pass filter reflecting the focus evaluation value by $1/25$ for the 25 peripheral blocks.

The filter coefficient matrix a_mid in B of FIG. 10 is a parameter that realizes a space low-pass filter smoothing the own block using 9 blocks including the peripheral blocks and the own block. That is, the smoothing is performed by reflecting $1/4$ of a weight coefficient (contribution ratio) to the focus evaluation value of the own block, reflecting $1/8$ of a weight coefficient to the focus evaluation values of the upper, lower, right, and left adjacent blocks, and reflecting $1/16$ of a weight coefficient to the focus evaluation values of the adjacent blocks in inclination directions.

The filter coefficient matrix a_low in A of FIG. 10 is a parameter that realizes a space low-pass filter smoothing the own block using 5 blocks including the peripheral blocks and the own block. That is, the smoothing is performed by reflecting $1/2$ of a weight coefficient to the focus evaluation value of the own block and reflecting $1/8$ of a weight coefficient to the focus evaluation values of the upper, lower, right, and left adjacent blocks.

All of the examples are merely examples. For example, in the case of FIG. 10, the stabilization effect of the filter coefficient matrix a_low is weak and the stabilization effect of the filter coefficient matrix a_high is strong.

Although not illustrated, of course, the space filter 64a is bypassed when the coefficient for the focus evaluation value of the own block is set to 1 and the coefficients for the peripheral blocks are set to 0.

Thus, even for the space filter 64a, the degree of the stabilization effect can be variably set or the validity and invalidity of the stabilization effect can be switched.

For the time filter 64b, the smoothing coefficient Coeff is set to be variable.

When the description is made using the example of the FIR filter described above, c0, c1, and c2 of Coeff=[c0 c1 c2] (where the numbers indicate the previous frames) are variably set.

For example, in the status of "c0=c1=c2=$1/3$," the stabilization process can be validated. By setting "c0=1" and "c1=c2=0," the stabilization process can be invalidated.

Of course, the two parameters can be set at further multiple stages.

For example, the status of "c0=c1=c2=$1/3$" is set to "valid Coeff," the status of "c0=1" and "c1=c2=0" is set to "invalid Coeff," and "smoothing coefficient Coeff=s×invalid Coeff+(1−s)×valid Coeff" is set. Here, "s" indicates a ratio or the parameter control.

When the parameters are set in this way, the time filter can be set at multiple stages from the valid state to the invalid state.

The parameters in the valid state are not limited to "$c0=c1=c2=\frac{1}{3}$." For example, when "$c0<c1<c2$" is set, the time filer is considered as the low-pass filter in which the time constant is very long and the degree of stabilization is high. In contrast, when "$c0>c1>c2$" is set, the time filter is a filter in which the effect is relatively moderate. These parameters may be set according to an actual apparatus. Of course, the number of taps is not limited either. The degree of stabilization can be considered to be changed by variably setting the number of taps. A sum of the coefficients c0 to c2 of the low-pass filter is set to 1 and "$c0>c1>c2$" is normally set. The larger the weight of c0 is, the weaker the low-pass filter is.

The example of the FIR filter has been described. However, in the case of an IIR filter, the degree of stabilization can be variably set by setting the cr value described above.

By changing the stabilization processing parameters, as described above, the degree of the stabilization process can be adjusted according to a circumstance. In step F110 of FIG. 9 described above, the stabilization processing parameter is changed as in each example described above as the filter mode setting.

Hereinafter, an example in which the stabilization parameters are variably set according to a noise component amount contained in the image data and an example in which the stabilization parameters are variably set according to a manipulation on the imaging apparatus 10 and a motion of a subject will be described.

First, the example in which the stabilization parameters are variable set according to a noise component amount contained in the image data will be described.

In the embodiment, the stabilization process by a digital filter or the like is introduced to suppress the influence of noise. The stabilization process functions in the low-pass filter. Therefore, there are an advantageous effect in which noise of the focus evaluation value is suppressed and a disadvantageous effect in which minute characteristics of the focus evaluation value are upset. Thus, as the stabilization is applied more strongly, either property can be shown remarkably.

Here, a noise amount of the focus evaluation value is correlated with a noise amount of the image data which is a target. That is, as the image data has more noise, an error of the focus evaluation value becomes larger.

Accordingly, when she intensity of she stabilization is changed according to the noise amount of the image data, the stabilization can be performed according to the characteristics of the error of the focus evaluation value.

More specifically, the fact that the noise amount of the image data is correlated with sensitivity (for example, the magnitude of an AGC gain to a photoelectric conversion signal of an imager) of a camera system is used. By switching a stabilization filter according to the sensitivity, the stabilization is configured to be applied more strongly as the sensitivity is higher.

Figure 11:
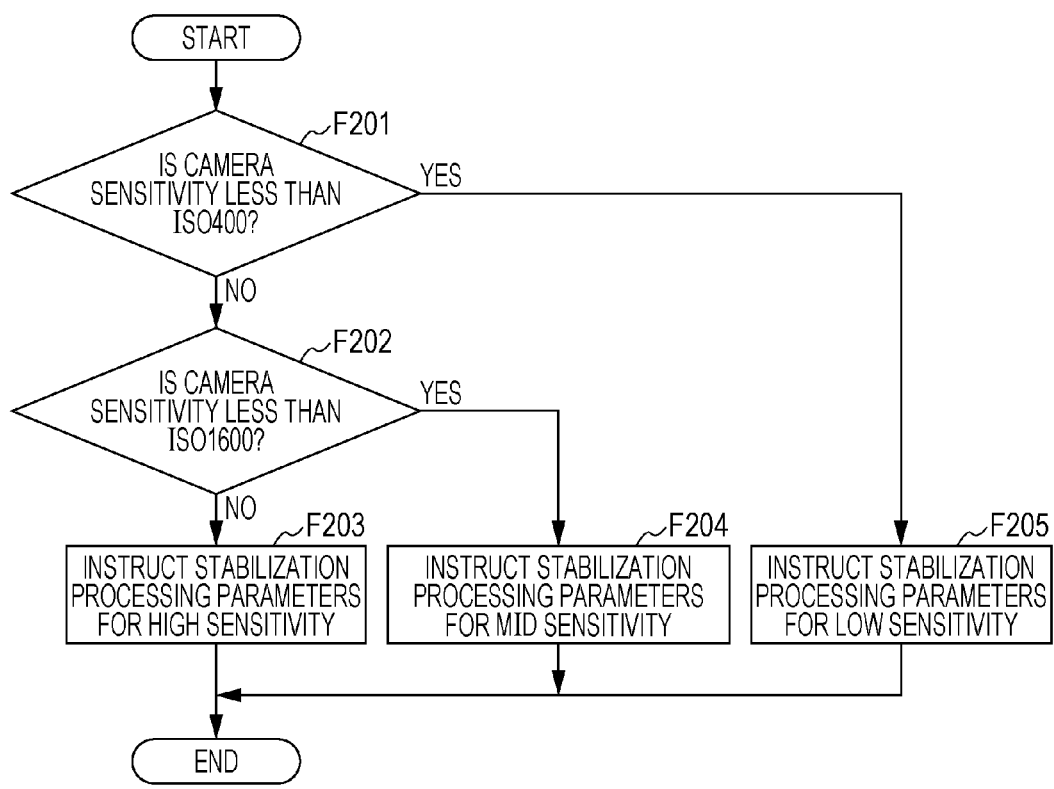
FIG. 11 is a flowchart illustrating a filter mode setting process (example 1) according to the embodiment.

Accordingly, the control unit 30 performs a filter mode setting process (example 1) in FIG. 11 by the function of the stabilization parameter setting unit 30a.

In step F201, the control unit 30 confirms whether the camera sensitivity is less than ISO400. In step F202, the control unit 30 confirms whether the camera sensitivity is less than ISO1600.

When the camera sensitivity is less than ISO400, the process proceeds to step F205 and the control unit 30 instructs the focus evaluation processing unit 27 to set the stabilization parameters for low sensitivity.

When the camera sensitivity is equal to or greater than ISO400 and is less than ISO1600, the process proceeds to step F204 and the control unit 30 instructs the focus evaluation processing unit 27 to set the stabilization parameters for mid sensitivity.

When the camera sensitivity is equal to or greater than ISO600, the process proceeds to step F203 and the control unit 30 instructs the focus evaluation processing unit 27 to set the stabilization parameters for high sensitivity.

In this way, the instruction to set the stabilization parameters in either of steps F203, F204 and F205 is given (the instruction SS in FIG. 5).

In step F110 of FIG. 9 described above, some or all of the limiter unit 65, the space filter 64a, and the time filter 64b perform the variable setting of the filter mode according to the instruction SS.

For example, in the case of the space filter 64a, the filter coefficient matrix a_high for the high sensitivity in C of FIG. 10 is set when the instruction to set the stabilization parameters for the high sensitivity is given in step F203.

The filter coefficient matrix amid for the mid sensitivity in B of FIG. 10 is set when the instruction to set the stabilization parameters for the mid sensitivity is given in step F204.

The filter coefficient matrix a_low for the low sensitivity in A of FIG. 10 is set when the instruction to set the stabilization parameters for the low sensitivity is given in step F205.

Even for the time filter 64b, the smoothing coefficient Coeff may be switched in the setting according to the high sensitivity, the mid sensitivity, and the low sensitivity in response to the instruction SS in steps F203, F204, and F205.

Likewise, in the limiter unit 65, the limit width E may be switched in the setting according to the high sensitivity, the mid sensitivity, and the low sensitivity in response to the instruction SS in steps F203, F204, and F205.

The control unit 30 performs control of the diaphragm mechanism as an exposure adjustment function, shutter speed control in the imager 12, and AGC gain control, for example, based on an exposure control value generated from the luminance value or the like of the captured image data by the digital signal processing unit 20.

Of the controls, the AGC gain influences noise in the captured image data. Since the control unit 30 performs the AGC gain control according to the camera sensitivity recognized in information such as an exposure control value from the digital signal processing unit 20, it is possible to comprehend a noise status on the captured image data according to the camera sensitivity.

That is, when a high sensitivity state is set by increasing the AGC gain, the image data has more noise. Therefore, for example, the stabilization effect is increased using the filter coefficient matrix a_high for the high sensitivity. In contrast, when a_low sensitivity state is set by decreasing the AGC gain, the image data has less noise. Therefore, since the stabilization effect may not be comparatively high, for example, the stabilization effect is lowered using the filter coefficient matrix a_low for the low sensitivity.

By doing so, the stabilization can be performed according to the characteristics of the error of the focus evaluation value by changing the intensity of the stabilization according to the noise amount of the image data.

In particular, when the time filter 64b is considered, the weakening of the stabilization effect also reduces the delay of the focus evaluation value (further, the focus information display) with respect to the monitoring image. Thus, when noise is small, the delay of the focus information display can be decreased as much as possible by changing the smoothing coefficient Coeff to a smoothing coefficient for low sensitivity in the time filter 64b.

Subsequently, a filter mode setting process (example 2) will be described as the example in which the stabilization parameters are variably set according to a user's manipulation on the imaging apparatus 10 or a motion of a subject.

When the focus evaluation value is stabilized through the focus information display process I of FIG. 8 described above and a pan/tilt manipulation or a zoom manipulation of the imaging apparatus 10 is performed or there is a motion of the subject, a relation between the position of the subject on a screen and the focus information may deviates due to delay of the stabilization of the focus evaluation value in some cases.

Further, when the user quickly performs a focus manipulation, the user may feel uneasy about delay of tracking of the focus evaluation value by the limiter processing or the smoothing process in some cases.

Accordingly, when a change occurs in an image due to a camera manipulation (here, a pan manipulation, a tilt manipulation, a zoom manipulation, and a focus manipulation are generally referred to as a camera manipulation) or a motion of the subject, content of the limiter processing or the smoothing process is changed to reduce time delay.

Figure 12:
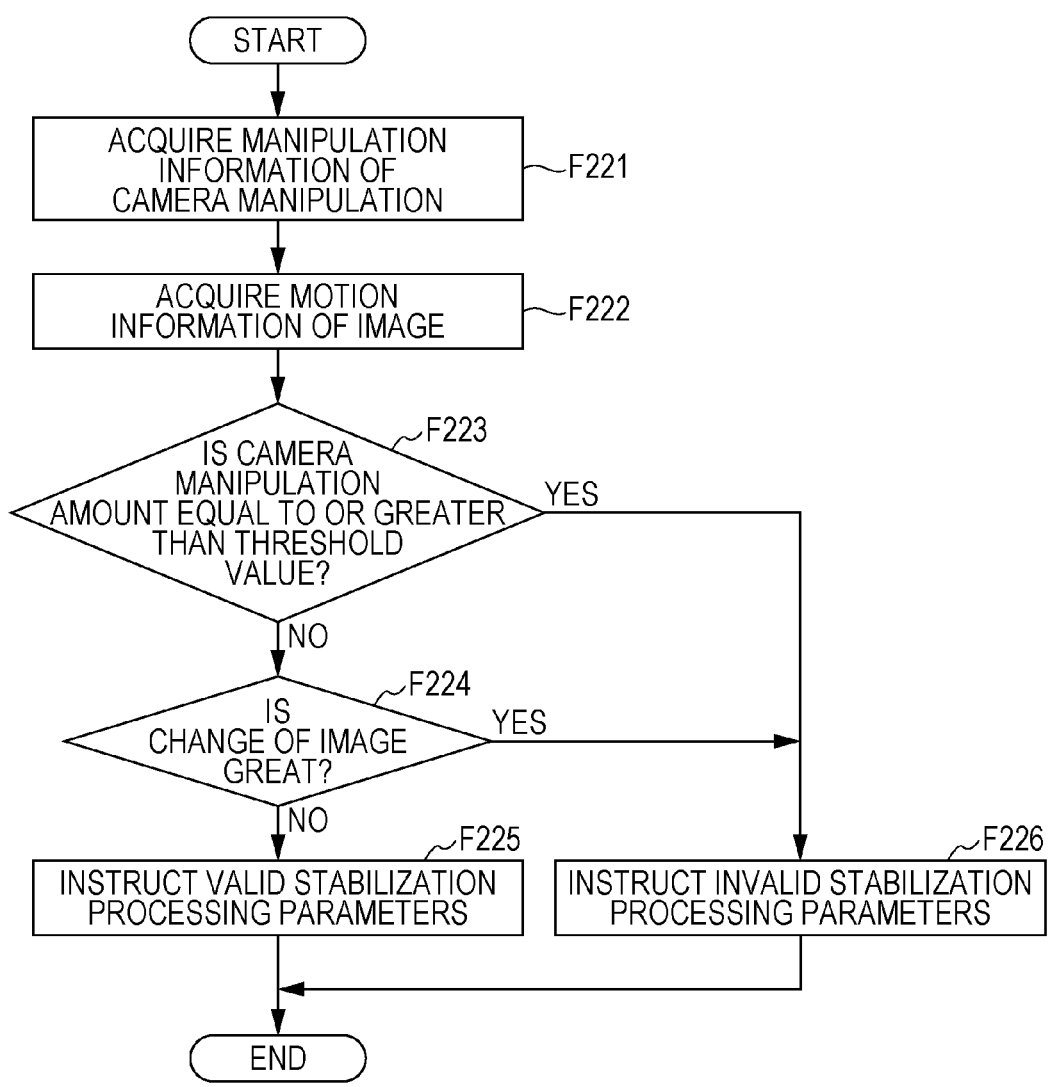
FIG. 12 is a flowchart illustrating a filter mode setting process (example 2) according to the embodiment.

An example in which the validation and bypass (invalidation) of the stabilization process are switched as the change is the filter mode setting process (example 2) in FIG. 12.

In step F221 of FIG. 12, the control unit 30 (stabilization parameter setting unit 30a) acquires manipulation information regarding a camera manipulation.

The control unit 30 can detect the manipulation information regarding a zoom manipulation or a focus manipulation as an input from the manipulation unit 35. Further, a pan/tilt manipulation is performed in response to a posture change or movement of the imaging apparatus 10 itself, but the control unit 30 can recognize the pan/tilt manipulation as detection information of the sensor unit 14 (the gyro sensor and the like).

In step F222, the control unit 30 acquires information regarding a motion of an image (subject) which is being captured. Specifically, the control unit 30 acquires motion information from the motion detection unit 28.

In step F223, the control unit 30 confirms whether camera manipulation amounts are equal to or greater than given threshold values. For example, a zoom manipulation amount is compared with a threshold value thz. A focus manipulation amount is compared with a threshold value thf. A pan movement amount is compared with a threshold value thp. A tilt movement amount is compared with a threshold value tht. When any one of the amounts is equal to or greater than the threshold value, the camera manipulation amount is determined to be equal to or greater than the threshold value.

In step F224, the control unit 30 confirms a change amount of the image. That is, the control unit 30 confirms whether an amount of motion information (for example, a scalar of a local vector or a global vector) is equal to or greater than a predetermined value.

When the control unit 30 determines in step F223 that the camera manipulation amount is equal to or greater than the threshold value or determines in step F224 that the change in the image is large, the process proceeds to step F226 and the control unit 30 gives an instruction to set invalid stabilization processing parameters as the instruction SS in FIG. 5.

Conversely, when the control unit 30 determines in step F223 that the camera manipulation amount is not equal to or greater than the threshold value or determines in step F224 that the change in the image is not large, the process proceeds to step F225 and the control unit 30 gives an instruction to set valid stabilization processing parameters as the instruction SS.

For example, when the instruction to set the valid stabilization processing barometers is given to the time filter 64b in step F225, the instruction to set, for example, "c0=c1=c2=⅓" is given for Coeff=[c0 c1 c2].

When the instruction to set the invalid stabilization processing parameters is given in step F226, the instruction to set "c0=1" and "c1=c2=0" is given.

When the instruction to set the valid stabilization processing parameters is given to the space filter 64a in step F225, the instruction to set the filter coefficient matrix a in FIG. 6B is given. When the instruction to set the invalid stabilization processing parameters is given in step F226, the instruction of the filter coefficient matrix as the setting of the bypass is given.

When the instruction to set the valid stabilization processing parameters is given to the limiter unit 65 in step F225, an instruction of a predetermined limit width Ex is given. When the instruction to set the invalid stabilization processing parameters is given in step F226, an instruction of a limit width Ey is given to substantially invalidate the limiter processing itself.

The side of the digital signal processing unit 20 (focus evaluation processing unit 27) performs the filter mode setting of step F110 of FIG. 9 in response to the instruction SS.

The above-described processes are based on the following idea. That is, the stabilization of the focus evaluation value and the minimization of the delay amount have a contradictory relation and thus may not be compatible. Therefore, the idea is that balance is maintained so that the minimization of the time delay is emphasized in a portion in which there is a motion and the stabilization is emphasized in a portion in which there is no motion. Through these processes, the stabilization process itself can be optimized.

Subsequently, a filter mode setting process (example 3) will be likewise described as the example in which the stabilization parameters are variably set according to a user's manipulation on the imaging apparatus 10 or a motion of a subject.

This processing example is an example in which the validation and invalidation (bypass) of the stabilization are not switched, but the degree of the stabilization process (the intensity of the stabilization process) is changed.

Figure 13:
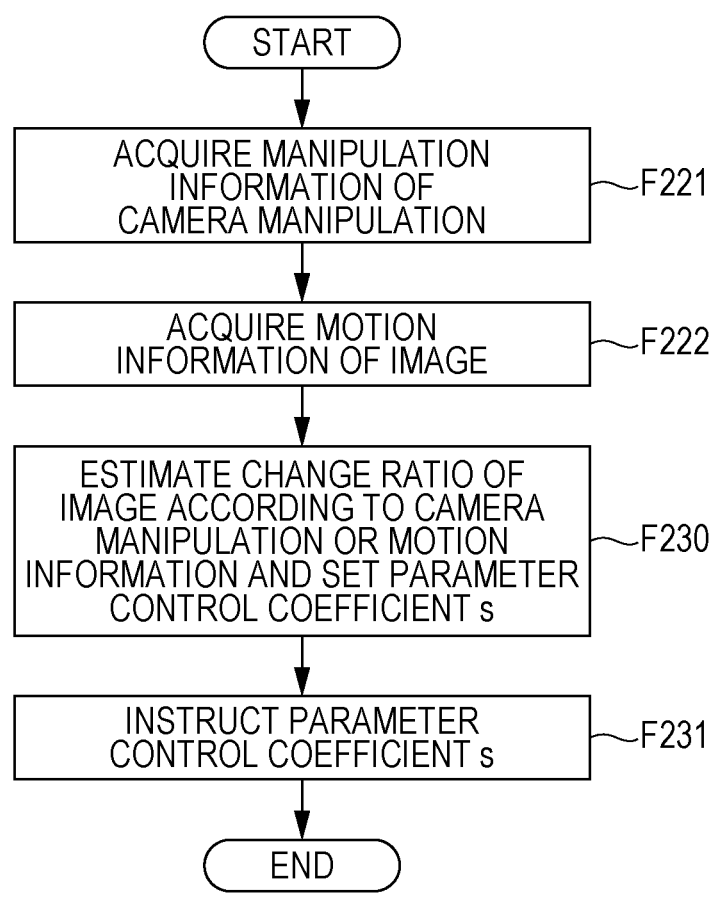
FIG. 13 is a flowchart illustrating a filter mode setting process (example 3) according to the embodiment.

FIG. 13 illustrates a process of the control unit 30 (stabilization parameter setting unit 30a). Steps F221 and F222 are the same as those in FIG. 12.

In step F230, the control unit 30 estimates a change ratio of an image according to a manipulation amount of a camera manipulation or motion information and sets a parameter control coefficient s.

Then, in step F231, the control unit 30 gives the parameter control coefficient s as the instruction SS to the focus evaluation processing unit 27.

The side of the digital signal processing unit 20 (focus evaluation processing unit 27) performs the filter mode setting of step F110 of FIG. 9 in response to the instruction SS.

The parameter control coefficient s set in step F230 is set to "$0 \leq s \leq 1$." As the camera manipulation amount becomes smaller and the motion of the image becomes smaller, the parameter control coefficient s is closer to 0. In contrast, as the camera manipulation amount is larger and the motion of the image is larger, the parameter control coefficient s is closer to 1.

How to actually obtain the parameter control coefficient s can be diversely considered.

For the camera manipulation, it can be considered that each of the pan manipulation, the tilt manipulation, the zoom manipulation, and the focus manipulation is compared as each manipulation amount with a threshold value at a multiple stages and the manipulation amount evaluated as the largest manipulation amount is reflected to the parameter control coefficient s.

For the motion information, the scalar value of the global vector of the image data may be reflected to the parameter control coefficient s, or the average value or the maximum value of the scalar values of the local vectors of the blocks BK may be reflected to the parameter control coefficient s.

The parameter control coefficient s may be obtained for each block BK using the scalar value of each local vector of each block BK.

As a method of reflecting both of information regarding a camera manipulation amount and the motion information, for example, a method of setting a reflection ratio to ½ each or a method of utilizing the side of a larger level can be considered.

The filter mode setting based on the parameter control coefficient s is performed specifically as follows.

For example, in the limiter unit 65, the limit width E is assumed to be set as follows:

$$E=(1+k\times s)\times E0.$$

Here, E0 is an initial value (a set value normally used when there is no change in the image) of the limit width E and k is a coefficient adjusting a method of expanding the limit width E.

That is, when the parameter control coefficient s=0, the limit width E=E0 and the limiter effect is the highest. When the parameter control coefficient s=1, the limit width E=(1+k)×E0. Thus, the limit width is the largest and the limiter effect decreases. When the parameter control coefficient s=0.5, the limiter effect is the median.

For example, for the time filter 64b, "smoothing coefficient Coeff=s×invalid Coeff+(1−s)×valid Coeff" described above is used.

When the parameter control coefficient s=0, the smoothing coefficient Coeff=valid Coeff and the stabilization effect is the highest. When the parameter control coefficient s=1, the smoothing coefficient Coeff=valid Coeff. Thus, the stabilization effect is the lowest. When the parameter control coefficient s=0.5, the stabilization effect is the median.

As in the above-described example, the focus information display proper to a circumstance is realized by switching the degree of stabilization according to the status of the camera manipulation or the motion information regarding the image.

For the space filter 64a, the filter coefficient matrix is, of course, assumed to be changed according to the parameter control coefficient s.

As described above, in the embodiment in which the filter mode setting is performed as the focus information display process II, the imaging apparatus 10 includes the stabilization parameter setting unit 30a that variably sets the processing parameters of the stabilization process in the evaluation value stabilization unit 62. In the embodiment, the following advantages can be obtained in addition to the advantages of the case of the focus information display process I described above.

In the stabilization process, the proper degree of stabilization, or a circumstance such as a case in which the stabilization has to be performed or a case in which the stabilization may not be performed is assumed in some cases. Accordingly, the uniform stabilization process is not typically performed, but the stabilization process proper according to a circumstance is performed by bypassing the stabilization process according to the circumstance or by increasing or decreasing the degree of stabilization.

For example, the stabilization parameter setting unit 30a can perform the stabilization according to the characteristics of the error of the focus evaluation value by variably setting the stabilization processing parameters according to a noise component amount contained in the image data.

Further, the stabilization parameter setting unit 30a performs the stabilization process suitable for a motion of the image by variably setting the stabilization processing parameters according to the manipulation information of the camera manipulation of the imaging apparatus 10 generating the image data or a motion of the image (subject). For example, when a motion of the subject is fast, the delay such as peaking display can be decreased by bypassing the stabilization process or decreasing the degree of stabilization. When there is no motion of the subject on the image, sufficient stabilization can be performed.

5. Application to Program and Computer Apparatus

The embodiment of the image processing apparatus 1 and the imaging apparatus 10 has been described above. The processes relevant to the above-described focus evaluation value can be performed by hardware or can be performed by software.

A program according to an embodiment is, for example, a program that causes an arithmetic processing device such as a CPU (Central Processing Unit) or a DSP (Digital Signal Processor) to perform the processes according to the above-described embodiment.

That is, the program according to the embodiment is a program that causes the arithmetic processing device to perform a process of generating the focus evaluation value indicating the degree of focus of the image data which is a target, a process of stabilizing the generated focus evaluation value, and a process of generating the display data, in which the focus information is added to the image data, using the focus evaluation value subjected to the stabilization process.

Specifically, the program according to the embodiment may be a program that causes the arithmetic processing device to perform the process in FIG. 3A, 3B, 8, or 9.

The program can realize an apparatus that performs the above-described focus information display using the arithmetic processing device.

The program can be recorded in advance in an HDD which is a recording medium included in an apparatus such as a computer apparatus or a ROM or the like in a microcomputer including a CPU.

The program can be stored (recorded) temporarily or permanently in a removable recording medium such as a flexible disk, a CD-ROM (Compact Disc Read Only Memory), an MO (Magnetic optical) disc, a DVD (Digital Versatile Disc), a Blu-ray Disc (registered trademark), a magnetic disk, a semiconductor memory, or a memory card. The removable recording medium can be provided as so-called packet software.

The program can be installed from a removable recording medium to a personal computer or the like and can also be downloaded from a download site via a network such as a LAN (Local Area Network) or the Internet.

The program is proper for broad provision of the image processing apparatus according to the embodiment. For example, by downloading the program to a personal computer, a portable information processing apparatus, a portable telephone, a game apparatus, a video apparatus, a PDA (Personal Digital Assistant), or the like, the personal computer or the like can be realized as the image processing apparatus according to an embodiment of the present technology.

Figure 14:
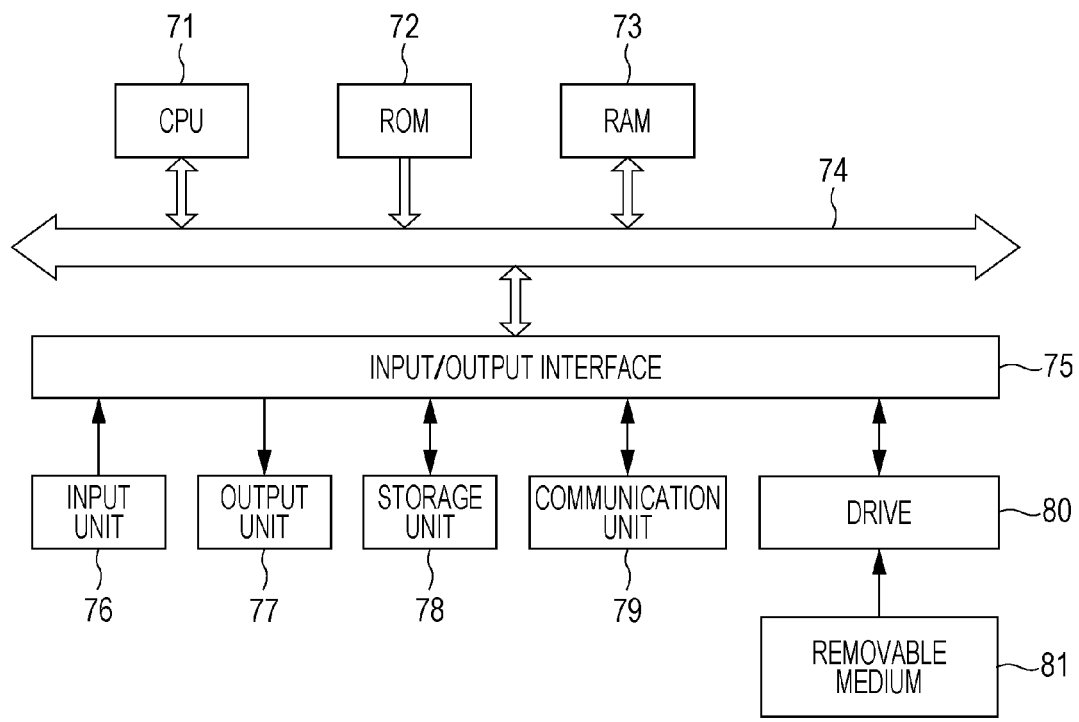
FIG. 14 is a block diagram illustrating a computer apparatus according to the embodiment.

For example, in a computer apparatus illustrated in FIG. 14, a process such as a process for the focus information display in the image processing apparatus 1 and the imaging apparatus 10 described above can be performed.

In FIG. 14, a CPU 71 of a computer apparatus 70 performs various processes according to a program stored in a ROM 72 or a program loaded from the storage unit 78 to a RAM 73. In the RAM 73, data or the like necessary for the CPU 71 to perform various processes is properly stored.

The CPU 71, the ROM 72, and the RAM 73 are connected to each other via a bus 74. An input/output interface 75 is also connected to the bus 74.

An input unit 76 configured by a keyboard, a mouse, or the like, a display configured by a CRT (Cathode Ray Tube), an LCD, an organic EL panel, or the like, an output unit 77 configured by a speaker or the like, a storage unit 78 configured by a hard disk or the like, and a communication unit 79 configured by a modem or the like are connected to the input/output interface 75. The communication unit 79 performs communication processing via a network including the Internet.

A drive 80 is also connected to the input/output interface 75, as necessary, and a removable medium 81 such as a magnetic disk, an optical disc, a magneto-optical disc, or a semiconductor memory is properly mounted so that a computer program read from the removable medium 81 is installed in the storage unit 78, as necessary.

When the process of remarkable display described above is performed by software, a program of the software is installed from a network or a recording medium.

For example, as illustrated in FIG. 14, the recording medium is configured by the removable medium 81 distributed to deliver a program to a user apart from the apparatus body and formed by a magnetic disk (including a flexible disk), an optical disc (including a Blu-ray disc, a CD-ROM, or a DVD), or a magneto-optical disc (including an MD (Mini Disc)), a semiconductor memory, or the like recording a program. Alternatively, the recording medium is also configured by the ROM 72 recording a program or a hard disk or the like included in the storage unit 78 so as to be delivered to a user in a state embedded in advance in the apparatus body.

The computer apparatus 70 can obtain and stabilize the focus evaluation value of an input image data and perform the focus information display according to the focus evaluation value by causing the CPU 71 to perform the process illustrated in FIG. 3A or 3B described above based on the program when moving image data is input through a reception operation by the communication unit 79 or a reproduction operation of the drive 30 (removable medium 81) or the storage unit 73. For example, the user can confirm a focus state on the side of the imaging apparatus on the display (output unit 77) of the computer apparatus 70 by inputting image data captured by the imaging apparatus.

6. Modification Examples

Various modification examples of the above-described embodiment can be considered.

The example of the peaking (enhancement and display) has been described as an example of the focus information display. However, as the peaking method, various methods are assumed as well as a method of increasing luminance and a method of changing a color. When luminance is changed, the enhancement and display can be realized in some cases by decreasing the luminance. For example, in the case of an image in which a whole face has high luminance, a user can easily recognize a focused portion by conversely decreasing luminance of only an enhanced and displayed portion.

For pixels to be enhanced and display, for example, not only an edge but also a whole subject in the focus state (for example, a face image portion of a person in a focus state) may be enhanced and displayed.

The focus information display is not limited to the peaking, but any method such as a non-focused portion shading process described above may be used as long as a focused portion is presented on a screen.

The process of generating the focus evaluation value may not necessarily be performed for each frame, but may be performed, for example, at an interval of intermittent frames such as an interval of one frame or an interval of two frames. Thus, a processing load for the generation and stabilization of the focus evaluation value is reduced.

The example in which the imaging apparatus 10 includes the display unit 34 has been described. The monitoring image (through image) in the embodiment of the present technology may be displayed using an external display apparatus of the imaging apparatus 10. Accordingly, an embodiment of the present technology can be applied even to the imaging apparatus 10 which does not include the display unit 34.

The processing examples of the stabilization parameter setting instruction from the control unit 30 have been described with reference to FIGS. 11, 12, and 13. However, for example, the setting according to the sensitivity in FIG. 11 and the setting according to a camera manipulation amount or an image motion in FIGS. 12 and 13 can also be combined.

The example in which the filter validation/filter bypass is selected in FIG. 12 and the degree of stabilization is set in FIG. 13 has been described. However, the user may select any one of the process of FIG. 12 and the process of FIG. 13 to be performed.

As the focus information display, the focused portion may not be presented on a screen, but the degree of focus on the entire screen may be expressed using an image, luminance, tone, or the like or may be indicated by a numerical value.

In particular, when the focus information display is performed on the entire screen, the focus evaluation value may not necessarily be generated for each block BK. For example, one focus evaluation value may be generated for the entire screen at each frame. In this case, the focus evaluation value can be considered to be stabilized through the process of the limiter unit 65 and the process of the time filter 64b.

When an embodiment of the present technology is applied to an apparatus that is not used as the imaging apparatus 10, such as the above-described computer apparatus 70, the delay of the monitoring image does not become a problem in some cases.

In the above-described imaging apparatus 10, the focus information display based on the focus evaluation value has been performed asynchronously for the monitoring image so that operability (framing or shutter timing standby) by a user does not deteriorate due to the delay of the monitoring image. However, the concern about the deterioration in the operability does not occur when the focus information is confirmed while displaying a reproduced image in the computer apparatus 70.

Thus, synchronization may be configured to be achieved so that the focus information based on the focus evaluation values obtained from the frames F(x), F(x−1), F(x−2), etc. is added to the image data of the frame F(x).

The stabilization technology for the focus evaluation value according to an embodiment of the present technology can also be used when it is necessary to evaluate a focus state, as well as auto-focus control.

The advantages described in the present specification are merely examples and are not limited. Further, other advantages may be obtained.

The present technology can use the following configurations:

(1) An image processing apparatus includes: an evaluation value generation unit configured to generate a focus evaluation value indicating a degree of focus of image data which is a target; an evaluation value stabilization unit configured to perform a stabilization process on the focus evaluation value generated by the evaluation value generation unit; and a display data generation unit configured to generate display data, in which focus information is added to the image data, using the focus evaluation value subjected to the stabilization process by the evaluation value stabilization unit.

(2) The image processing apparatus described in the foregoing (1) may further include a stabilization parameter setting unit configured to variably set a processing parameter of the stabilization process performed by the evaluation value stabilization unit.

(3) In the image processing apparatus described in the foregoing (1) or (2), the evaluation value generation unit may generate the focus evaluation value for each of a plurality of blocks divided as regions from the image data of one frame which is a target.

(4) In the image processing apparatus described in any one of the foregoing (1) to (3), the evaluation value stabilization unit may perform limiter processing as the stabilization process such that a difference between the focus evaluation value of the image data of one frame which is a target and the focus evaluation value of the image data of a previous frame is within a predetermined value.

(5) In the image processing apparatus described in any one of the foregoing (1) to (4), the evaluation value generation unit may generate the focus evaluation value for each of a plurality of blocks divided as regions from the image data of one frame which is a target. The evaluation value stabilization unit may perform limiter processing as the stabilization process such that a difference between the focus evaluation value of each block and the focus evaluation value of the corresponding block of the image data of a previous frame is within a predetermined value.

(6) In the image processing apparatus described in any one of the foregoing (1) to (5), the evaluation value stone of the foregoing (1) to (5), the evaluation value stabilization unit may perform time domain filtering as the stabilization process such that the focus evaluation value of the image data of one frame which is a target is smoothed using the focus evaluation value of the image data of one previous frame or a plurality of previous frames.

(7) In the image processing apparatus described in any one of the foregoing (1) to (6), the evaluation value generation unit may generate the focus evaluation value for each of a plurality of blocks divided as regions from the image data of one frame which is a target. The evaluation value stabilization unit may perform time domain filtering as the stabilization process such that the focus evaluation value of each block of the image data of one frame which is a target is smoothed using the focus evaluation value of the corresponding block of the image data of one previous frame or a plurality of previous frames.

(8) In the image processing apparatus described in any one of the foregoing (1) to (7), the evaluation value generation unit may generate the focus evaluation value for each of a plurality of blocks divided as regions from the image data of one frame which is a target. The evaluation value stabilization unit may perform spatial domain filtering as the stabilization process such that the focus evaluation value of each block of the image data of one frame which is a target is smoothed using the focus evaluation value of one adjacent block or the plurality of adjacent blocks.

(9) In the image processing apparatus described in the foregoing (2), the stabilization parameter setting unit may variably set the processing parameter of the stabilization process according to a noise component amount contained in the image data.

(10) In the image processing apparatus described in the foregoing (2) or (9), the stabilization parameter setting unit may variably set the processing parameter of the stabilization process according to manipulation information of an imaging apparatus generating image data.

(11) In the image processing apparatus described in the foregoing (2), (9), or (10), the stabilization parameter setting unit may variably set the processing parameter of the stabilization process according to motion information of image content detected from the image data of a plurality of frames.

(12) In she image processing apparatus described in any one of the foregoing (1) to (11), the display data generation unit may generate the display data in which an image indicating a focus position is added as the focus information.

(13) In the image processing apparatus described in any one of the foregoing (1) to (12), the image data for which the focus evaluation value is generated by the evaluation value generation unit and which is the target may be image data of each frame forming the display data. The display data generation unit may generate the display data by adding the focus information to the image data of each frame forming the display data without synchronization with a frame in which the focus evaluation value which is a source of the focus information is generated.

(14) An image processing method includes: generating a focus evaluation value indicating a degree of focus of image data which is a target; performing a stabilization process on the generated focus evaluation value; and generating display data, in which focus information is added to the image data, using the focus evaluation value subjected to the stabilization process.

(15) A program causes an arithmetic processing device to perform: a process of generating a focus evaluation value indicating a degree of focus of image data which is a target; a process of stabilizing the generated focus evaluation value; and a process of generating display data, in which focus information is added to the image data, using the focus evaluation value subjected to the stabilization process.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an evaluation value generation unit configured to generate a focus evaluation value indicating a degree of focus of image data which is a target;
an evaluation value stabilization unit configured to perform a stabilization process on the focus evaluation value generated by the evaluation value generation unit,
wherein the evaluation value stabilization unit is configured to perform limiter processing as the stabilization process such that a difference between the focus evaluation value of the image data of one frame which is the target and the focus evaluation value of the image data of a previous frame is within a first predetermined value; and a display data generation unit configured to generate display data, in which focus information is added to the image data, using the focus evaluation value subjected to the stabilization process by the evaluation value stabilization unit.

2. The image processing apparatus according to claim 1, further comprising:

a stabilization parameter setting unit configured to variably set a processing parameter of the stabilization process performed by the evaluation value stabilization unit.

3. The image processing apparatus according to claim 1, wherein the evaluation value generation unit is configured to generate the focus evaluation value for each of a plurality of blocks divided as regions from the image data of one frame which is the target.

4. The image processing apparatus according to claim 1, wherein the evaluation value generation unit is configured to generate the focus evaluation value for each of a plurality of blocks divided as regions from the image data of one frame which is the target, and wherein the evaluation value stabilization unit is configured to perform the limiter processing as the stabilization process such that a difference between the focus evaluation value of each block and the focus evaluation value of the corresponding block of the image data of the previous frame is within a second predetermined value.

5. The image processing apparatus according to claim 1, wherein the evaluation value stabilization unit is configured to perform time domain filtering as the stabilization process such that the focus evaluation value of the image data of one frame which is the target is smoothed using the focus evaluation value of the image data of one previous frame or a plurality of previous frames.

6. The image processing apparatus according to claim 1, wherein the evaluation value generation unit is configured to generate the focus evaluation value for each of a plurality of blocks divided as regions from the image data of one frame which is the target, and wherein the evaluation value stabilization unit is configured to perform time domain filtering as the stabilization process such that the focus evaluation value of each block of the image data of one frame which is the target is smoothed using the focus evaluation value of the corresponding block of the image data of one previous frame or a plurality of previous frames.

7. The image processing apparatus according to claim 1, wherein the evaluation value generation unit is configured to generate the focus evaluation value for each of a plurality of blocks divided as regions from the image data of one frame which is the target, and wherein the evaluation value stabilization unit is configured to perform spatial domain filtering as the stabilization process such that the focus evaluation value of each block of the image data of one frame which is the target is smoothed using the focus evaluation value of one adjacent block or the plurality of adjacent blocks.

8. The image processing apparatus according to claim 2, wherein the stabilization parameter setting unit is configured to variably set the processing parameter of the stabilization process according to a noise component amount contained in the image data.

9. The image processing apparatus according to claim 2, wherein the stabilization parameter setting unit is configured to variably set the processing parameter of the stabilization process according to manipulation information of an imaging apparatus generating image data.

10. The image processing apparatus according to claim 2, wherein the stabilization parameter setting unit is configured to variably set the processing parameter of the stabilization process according to motion information of image content detected from the image data of a plurality of frames.

11. The image processing apparatus according to claim 1, wherein the display data generation unit is configured to generate the display data in which an image indicating a focus position is added as the focus information.

12. The image processing apparatus according to claim 1, wherein the image data for which the focus evaluation value is generated by the evaluation value generation unit and which is the target is image data of each frame forming the display data, and wherein the display data generation unit is configured to generate the display data by adding the focus information to the image data of each frame forming the display data without synchronization with a frame in which the focus evaluation value which is a source of the focus information is generated.

13. An image processing method comprising:

generating a focus evaluation value indicating a degree of focus of image data which is a target;

performing a stabilization process on the generated focus evaluation value, wherein the stabilization process comprises limiter processing such that a difference between the focus evaluation value of the image data of one frame which is the target and the focus evaluation value of the image data of a previous frame is within a predetermined value; and generating display data, in which focus information is added to the image data, using the focus evaluation value subjected to the stabilization process.

14. A non-transitory computer-readable storage medium, having stored thereon, a set of computer-executable instructions for causing an arithmetic processing device to perform:

a process of generating a focus evaluation value indicating a degree of focus of image data which is a target;

a process of stabilizing the generated focus evaluation value, wherein the stabilization process comprises limiter processing such that a difference between the focus evaluation value of the image data of one frame which is the target and the focus evaluation value of the image data of a previous frame is within a predetermined value; and a process of generating display data, in which focus information is added to the image data, using the focus evaluation value subjected to the stabilization process.

15. An image processing apparatus comprising:

an evaluation value generation unit configured to generate a focus evaluation value indicating a degree of focus of image data which is a target;

an evaluation value stabilization unit configured to perform a stabilization process on the focus evaluation value generated by the evaluation value generation unit; and a display data generation unit configured to generate display data, in which focus information is added to the image data, using the focus evaluation value subjected to the stabilization process by the evaluation value stabilization unit, wherein the evaluation value generation unit is configured to generate the focus evaluation value for each of a plurality of blocks divided as regions from the image data of one frame which is the target, and wherein the evaluation value stabilization unit is configured to perform limiter processing as the stabilization process such that a difference between the focus evaluation value of each block and the focus evaluation value of the corresponding block of the image data of a previous frame is within a predetermined value.

16. An image processing apparatus comprising:

an evaluation value generation unit configured to generate a focus evaluation value indicating a degree of focus of image data which is a target;

an evaluation value stabilization unit configured to perform a stabilization process on the focus evaluation value generated by the evaluation value generation unit; and a display data generation unit configured to generate display data, in which focus information is added to the image data, using the focus evaluation value subjected to the stabilization process by the evaluation value stabilization unit, wherein the evaluation value generation unit is configured to generate the focus evaluation value for each of a plurality of blocks divided as regions from the image data of one frame which is the target, and wherein the evaluation value stabilization unit is configured to perform time domain filtering as the stabilization process such that the focus evaluation value of each block of the image data of one frame which is the target is smoothed using the focus evaluation value of the corresponding block of the image data of one previous frame or a plurality of previous frames.

17. An image processing apparatus comprising:

an evaluation value generation unit configured to generate a focus evaluation value indicating a degree of focus of image data which is a target;

an evaluation value stabilization unit configured to perform a stabilization process on the focus evaluation value generated by the evaluation value generation unit;

a stabilization parameter setting unit configured to variably set a processing parameter of the stabilization process according to motion information of image content detected from the image data of a plurality of frames; and a display data generation unit configured to generate display data, in which focus information is added to the image data, using the focus evaluation value subjected to the stabilization process by the evaluation value stabilization unit.

* * * * *